US011368348B2

United States Patent
Hu et al.

(10) Patent No.: US 11,368,348 B2
(45) Date of Patent: Jun. 21, 2022

(54) SIGNAL TRANSMISSION METHOD AND APPARATUS

(71) Applicant: Huawei Technologies Co., Ltd., Shenzhen (CN)

(72) Inventors: Yuanzhou Hu, Shanghai (CN); Fan Wang, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/324,873

(22) Filed: May 19, 2021

(65) Prior Publication Data

US 2021/0288860 A1 Sep. 16, 2021

Related U.S. Application Data

(63) Continuation of application No. PCT/CN2019/115803, filed on Nov. 5, 2019.

(30) Foreign Application Priority Data

Nov. 19, 2018 (CN) .......................... 201811377847.6

(51) Int. Cl.
*H04L 27/26* (2006.01)
*H04L 27/20* (2006.01)

(52) U.S. Cl.
CPC .......... *H04L 27/2628* (2013.01); *H04L 27/20* (2013.01)

(58) Field of Classification Search
CPC . H04L 27/26; H04L 27/2601; H04L 27/2626; H04L 27/2627; H04L 27/2634;
(Continued)

(56) References Cited

U.S. PATENT DOCUMENTS 6,434,188 B1 * 8/2002 Hwang ............... H04L 27/2602
375/222
6,928,084 B2 * 8/2005 Cimini, Jr. .......... H04L 27/2615
370/430
(Continued)

FOREIGN PATENT DOCUMENTS

CN 101374125 A 2/2009
CN 101753511 A 6/2010
(Continued)

OTHER PUBLICATIONS

"Feasibility study on subband constellation rotation for uplink PAPR reduction for CP-OFDM waveform," 3GPP TSG RAN WG1 AH_NR Meeting, R1-1710405, Qingdao, P.R. China, pp. 1-5, 3rd Generation Partnership Project, Valbonne, France (Jun. 27-30, 2017).
(Continued)

*Primary Examiner* — James M Perez
(74) *Attorney, Agent, or Firm* — Leydig, Voit & Mayer, Ltd.

(57) ABSTRACT

A signal transmission method and apparatus are provided, to resolve a problem that because a PAPR of a signal is comparatively high, a waveform distortion of the signal is comparatively serious after power amplification is performed on the signal by using a PA. The method includes: separately performing phase rotation on M pieces of modulated data to obtain M pieces of phase-rotated data, where a phase factor for performing phase rotation on the M pieces of modulated data is determined based on M. The method further includes: determining time domain data based on the M pieces of phase-rotated data, and sending the time domain data to a receive end.

20 Claims, 9 Drawing Sheets

(58) Field of Classification Search
CPC . H04L 27/2636; H04L 27/2628; H04L 27/20; H04L 27/26526
See application file for complete search history.

(56) References Cited

U.S. PATENT DOCUMENTS

| | | | | | |
|---|---|---|---|---|---|
| 7,529,305 | B1* | 5/2009 | Tong | | H04L 1/0618 375/267 |
| 7,680,210 | B2* | 3/2010 | Bode | | H04L 27/20 375/297 |
| 7,720,175 | B2* | 5/2010 | Yeon | | H04L 27/2624 375/296 |
| 7,924,958 | B2* | 4/2011 | Hwang | | H04L 1/0048 375/138 |
| 7,969,205 | B2* | 6/2011 | Nagatani | | H04L 27/2623 370/208 |
| 8,204,150 | B2* | 6/2012 | Han | | H04L 5/0023 375/267 |
| 8,514,695 | B2* | 8/2013 | Liu | | H04L 5/0016 370/208 |
| 8,831,136 | B2* | 9/2014 | Ishikawa | | H03F 1/3241 375/295 |
| 8,891,674 | B2* | 11/2014 | Park | | H04L 27/2618 375/268 |
| 8,909,686 | B2* | 12/2014 | Kameya | | G06F 17/141 708/405 |
| 8,971,170 | B2* | 3/2015 | Ikeda | | H04L 27/263 370/210 |
| 8,976,878 | B2* | 3/2015 | Manzi | | H04L 27/2627 375/267 |
| 9,160,433 | B2* | 10/2015 | Liu | | H04B 7/06 |
| 9,413,499 | B2* | 8/2016 | Higuchi | | H04B 1/7103 |
| 9,571,140 | B2* | 2/2017 | Thomas | | H04L 27/265 |
| 9,641,374 | B2* | 5/2017 | Li | | H04L 27/26362 |
| 9,848,342 | B1* | 12/2017 | McCallister | | H04W 52/52 |
| 10,069,666 | B2* | 9/2018 | Lin | | H04L 27/2607 |
| 10,263,736 | B2* | 4/2019 | Kang | | H04L 27/04 |
| 10,312,990 | B2* | 6/2019 | Qu | | H04L 27/2621 |
| 10,404,341 | B2* | 9/2019 | Murakami | | H04L 27/36 |
| 10,498,423 | B2* | 12/2019 | Wu | | H04B 7/0456 |
| 10,567,062 | B2* | 2/2020 | Yang | | H04B 7/0639 |
| 10,680,870 | B2* | 6/2020 | Levinbook | | H04L 27/2602 |
| 10,736,073 | B2* | 8/2020 | Chen | | G01S 5/0236 |
| 10,778,490 | B2* | 9/2020 | Peng | | H04L 5/0053 |
| 10,790,926 | B2* | 9/2020 | Cheng | | H04L 1/0003 |
| 10,904,868 | B2* | 1/2021 | Lei | | H04L 27/20 |
| 10,924,315 | B2* | 2/2021 | Dong | | H04L 27/2675 |
| 11,025,393 | B2* | 6/2021 | Ding | | H04L 1/00 |
| 11,025,467 | B2* | 6/2021 | Hu | | H04L 27/2614 |
| 11,108,605 | B2* | 8/2021 | Zhang | | H04L 5/0048 |
| 11,108,609 | B2* | 8/2021 | Levinbook | | H04L 27/2614 |
| 11,139,906 | B2* | 10/2021 | Hu | | H04J 13/22 |
| 2003/0202460 | A1* | 10/2003 | Jung | | H04L 27/2621 370/480 |
| 2006/0072682 | A1* | 4/2006 | Kent | | H04L 25/0214 375/267 |
| 2006/0215784 | A1* | 9/2006 | Nam | | H04B 7/0689 375/299 |
| 2006/0269022 | A1* | 11/2006 | Li | | H04L 1/06 375/347 |
| 2007/0211816 | A1* | 9/2007 | Hwang | | H04B 7/0671 375/267 |
| 2008/0031375 | A1* | 2/2008 | Zhou | | H04L 25/0204 375/267 |
| 2009/0004984 | A1* | 1/2009 | Chrabieh | | H04L 5/0044 455/205 |
| 2009/0052577 | A1* | 2/2009 | Wang | | H04L 1/0643 375/299 |
| 2009/0080454 | A1* | 3/2009 | Koyanagi | | H04L 27/2621 370/445 |
| 2009/0196163 | A1* | 8/2009 | Du | | H04L 27/2613 370/204 |
| 2009/0245399 | A1* | 10/2009 | Lee | | H04L 27/2605 375/260 |
| 2010/0239046 | A1* | 9/2010 | Chun | | H04L 1/0003 375/295 |
| 2010/0260234 | A1* | 10/2010 | Thomas | | H04L 1/0026 375/141 |
| 2011/0116566 | A1* | 5/2011 | Takahashi | | H04L 27/2636 375/267 |
| 2011/0228878 | A1* | 9/2011 | Sorrentino | | H04L 5/0023 375/295 |
| 2016/0094318 | A1* | 3/2016 | Shattil | | H04L 27/265 375/267 |
| 2016/0182270 | A1* | 6/2016 | Jungnickel | | H04L 27/2643 375/260 |
| 2018/0191410 | A1* | 7/2018 | Liu | | H04B 7/0478 |
| 2018/0198668 | A1* | 7/2018 | Kim | | H04L 25/03834 |
| 2018/0324005 | A1* | 11/2018 | Kim | | H04L 25/03834 |
| 2019/0013912 | A1* | 1/2019 | Tomeba | | H04L 5/0053 |
| 2019/0081840 | A1* | 3/2019 | Park | | H04L 27/2613 |
| 2019/0116004 | A1* | 4/2019 | Goto | | H04L 5/0048 |
| 2019/0132866 | A1* | 5/2019 | Goto | | H04L 27/26 |
| 2019/0222456 | A1* | 7/2019 | Zeng | | H04L 27/20 |
| 2019/0273643 | A1* | 9/2019 | Dong | | H04L 27/2605 |
| 2019/0313398 | A1* | 10/2019 | Matsumura | | H04L 27/26 |
| 2020/0021414 | A1* | 1/2020 | Ding | | H04L 27/233 |
| 2020/0059335 | A1* | 2/2020 | Hu | | H04W 72/0413 |
| 2020/0067621 | A1* | 2/2020 | Hu | | H04L 1/00 |
| 2020/0204421 | A1* | 6/2020 | Levinbook | | H04L 27/2602 |
| 2020/0328926 | A1* | 10/2020 | Hu | | H04L 27/2621 |
| 2021/0281460 | A1* | 9/2021 | Hu | | H04L 27/2614 |
| 2021/0288855 | A1* | 9/2021 | Hu | | H04L 5/0007 |
| 2021/0288860 | A1* | 9/2021 | Hu | | H04L 27/2621 |
| 2022/0021570 | A1* | 1/2022 | Hu | | H04L 27/183 |

FOREIGN PATENT DOCUMENTS

| | | |
|---|---|---|
| CN | 103326985 A | 9/2013 |
| CN | 103458485 A | 12/2013 |
| CN | 103973629 A | 8/2014 |
| CN | 104022994 A | 9/2014 |
| CN | 104639281 A | 5/2015 |
| CN | 104780135 A | 7/2015 |
| CN | 105681241 A | 6/2016 |
| CN | 106357585 A | 1/2017 |
| CN | 107040487 A | 8/2017 |
| CN | 107800662 A | 3/2018 |
| WO | 2016070330 A1 | 5/2016 |

OTHER PUBLICATIONS

"Short duration PUCCH for smaller payload sizes," 3GPP TSG RAN WG1 Meeting #88, R1-1701645, Athens, Greece, Total 8 pages, 3rd Generation Partnership Project, Valbonne, France (Feb. 13-17, 2017).

"3rd Generation Partnership Project; Technical Specification Group Radio Access Network; NR; Physical channels and modulation (Release 15)," 3GPP TS 38.211 V15.3.0, pp. 1-96, 3rd Generation Partnership Project, Valbonne, France (Sep. 2018).

"3rd Generation Partnership Project; Technical Specification Group Radio Access Network; Evolved Universal Terrestrial Radio Access (E-UTRA); Physical channels and modulation (Release 15)," 3GPP TS 36.211 V15.3.0, pp. 1-237, 3rd Generation Partnership Project, Valbonne, France (Sep. 2018).

* cited by examiner

SIGNAL TRANSMISSION METHOD AND APPARATUS

CROSS-REFERENCE TO RELATED APPLICATIONS

This application is a continuation of International Application No. PCT/CN2019/115803, filed on Nov. 5, 2019, which claims priority to Chinese Patent Application No. 201811377847.6, filed on Nov. 19, 2018. The disclosures of the aforementioned applications are hereby incorporated by reference in their entireties.

TECHNICAL FIELD

This application relates to the field of communications technologies, and in particular, to a signal transmission method and apparatus.

BACKGROUND

In a communications system, a transmit end performs power amplification on a signal by using a power amplifier (PA) before sending the signal. A function of amplifying a signal by the PA includes a linear region and a non-linear region. As shown in FIG. 1, when a power of an input signal is comparatively low, the input signal corresponds to the linear region of the PA; or when a power of an input signal is comparatively high, the input signal corresponds to the non-linear region of the PA. In the linear region, an amplification gain of the PA is a constant, that is, a power ratio of the pre-amplification input signal to an amplified output signal is a constant, and phases of the input signal and the output signal are the same. In the non-linear region, an amplification gain of the PA decreases with an increase in the power of the input signal, and the PA may even have no amplification effect.

Amplitudes at different sampling points of the input signal are different. A sampling point with a comparatively small amplitude corresponds to the linear region of the PA, and a sampling point with a comparatively large amplitude corresponds to the non-linear region of the PA. Because amplification gains in the linear region and the non-linear region of the PA are different, amplification gains for sampling points of the input signal that have different amplitudes are different after the input signal passes through the PA, thereby causing a waveform distortion of the output signal. A waveform distortion degree of the output signal is directly proportional to a peak to average power ratio (PAPR) of the input signal. To be specific, a higher PAPR of the input signal indicates a more serious waveform distortion after the input signal passes through the PA.

SUMMARY

This application provides a signal transmission method and apparatus, to resolve a problem that because a PAPR of a signal is comparatively high, a waveform distortion of the signal is comparatively serious after power amplification is performed on the signal by using a PA.

According to a first aspect, this application provides a signal transmission method. The method may be applied to a transmit end, a chip, a chipset, a functional module that is in a chip and that performs the method, another module that can be used to implement the method, or the like. The method includes: separately performing phase rotation on M pieces of modulated data to obtain M pieces of phase-rotated data, where a phase factor used for performing phase rotation on the M pieces of modulated data is determined based on M. The method further includes: determining time domain data based on the M pieces of phase-rotated data, and sending the time domain data to a receive end. In this embodiment of this application, a phase of the modulated data is adjusted based on the phase factor corresponding to a length of the modulated data, so that a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end.

In an embodiment, when phase rotation is separately performed on the M pieces of modulated data, phase rotation may be performed on modulated data with an index m in the M pieces of modulated data based on a phase factor corresponding to the modulated data with the index m, where m traverses 0 to M−1, and m is an integer.

In an embodiment, the phase factor corresponding to the modulated data with the index m is:

$e^{j\times\varphi_m} = e^{j2\pi\times m\times \lfloor M\times A/h\rfloor/M}$, where $e^{j\times\varphi_m}$ is the phase factor corresponding to the modulated data with the index m, and A and h are integers. In the foregoing embodiment, a phase factor is determined based on a length M of modulated data, so that modulated data with different lengths can have corresponding phase factors, and a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end. In addition, with the foregoing embodiment, a PAPR of modulated data with any length can be reduced. For example, the length of the modulated data is an odd number, for example, M=3, M=5, M=7, or M=9.

In an embodiment, A may be equal to 1, −1, 3, or −3, and h may be equal to 4.

In an embodiment, Fourier transform and inverse Fourier transform may be sequentially performed on the M pieces of phase-rotated data to obtain the time domain data.

In an embodiment, alternatively, Fourier transform, frequency domain filtering, and inverse Fourier transform may be sequentially performed on the M pieces of phase-rotated data to obtain the time domain data.

In an embodiment, a frequency domain filter for the frequency domain filtering may be determined based on an initial filter including K×M filter coefficients, and the frequency domain filter includes M filter coefficients. With the foregoing embodiment, an extraction operation is performed on the initial filter to obtain the frequency domain filter. The generated frequency domain filter is orthogonal. When frequency domain filtering is performed on M pieces of frequency domain data, interference caused by the frequency domain filtering operation can be reduced. Therefore, during ideal channel estimation with a known noise, a network device can correctly demodulate the modulated data.

In an embodiment, the M filter coefficients may be extracted from the K×M filter coefficients in the initial filter at a step of K to obtain the frequency domain filter. With the frequency domain filter obtained in the foregoing embodiment, comparatively small interference may be caused when frequency domain filtering is performed. Therefore, during ideal channel estimation with a known noise, a network device can correctly demodulate the modulated data.

In an embodiment, a location, in the initial filter, of a filter coefficient with an index m in the frequency domain filter may satisfy the following formula:

$$S_{filter}(m)=S_{base}((A\times K\times M/h)\bmod K+m\times K), \text{ where}$$

$S_{filter}(m)$ indicates the filter coefficient with the index m in the frequency domain filter coefficients, $S_{base}((A\times K\times M/h) \bmod K+m\times K)$ indicates a filter coefficient with an index $(A\times K\times M/h)\bmod K+m\times K$ in the initial filter, and A and h are integers.

In an embodiment, K may be determined based on M. In the foregoing embodiment, K is determined based on the length M of the modulated data, so that the frequency domain filter obtained through extraction by using K has comparatively good orthogonality, thereby reducing interference caused when the frequency domain filter performs frequency domain filtering.

In an embodiment, K may be $K=4\times B/\gcd(M, 4)$, where $\gcd(M, 4)$ means taking a greatest common divisor of M and 4, and B is a positive integer.

In an embodiment, a frequency domain filter coefficient for the frequency domain filtering may be alternatively determined based on signaling from a network device.

In an embodiment, alternatively, Fourier transform, inverse Fourier transform, and time domain filtering may be sequentially performed on the M pieces of phase-rotated data to obtain the time domain data.

In an embodiment, a time domain filter coefficient for the time domain filtering may be determined based on signaling from a network device.

In an embodiment, a time domain filter for the time domain filtering may be obtained by performing inverse Fourier transform on the frequency domain filter. In the foregoing embodiment, an extraction operation is performed on the initial filter to obtain the frequency domain filter. Then inverse Fourier transform is performed on the frequency domain filter to obtain the time domain filter. The time domain filter can reduce interference caused during time domain filtering. Therefore, during ideal channel estimation with a known noise, a network device can correctly demodulate the modulated data.

In an embodiment, the M pieces of modulated data are BPSK modulated data.

According to a second aspect, this application provides a signal transmission method. The method may be applied to a transmit end, a chip, a chipset, a functional module that is in a chip and that performs the method, another module that can be used to implement the method, or the like. The method includes: performing Fourier transform on M pieces of modulated data to obtain M pieces of frequency domain data, and performing a cyclic shift on the M pieces of frequency domain data to obtain M pieces of shifted frequency domain data, where a shift length used for performing the cyclic shift on the frequency domain data is determined based on M. The method further includes: determining time domain data based on the M pieces of shifted frequency domain data, and sending the time domain data to a receive end. In this embodiment of this application, the cyclic shift is performed on the frequency domain data based on the shift length corresponding to a length of the frequency domain data, so that an effect of adjusting a phase of the modulated data based on a phase factor corresponding to a length of the modulated data can be implemented, and a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end.

In an embodiment, shifted frequency domain data with an index k in the M pieces of shifted frequency domain data may satisfy the following formula, where k traverses 0 to M−1, and k is an integer:

$$d_{shift}(k)=d_{fre}((k-Q_{shift})\bmod M), \text{ where}$$

$d_{shift}(k)$ is the shifted frequency domain data with the index k in the M pieces of shifted frequency domain data, $d_{fre}((k-Q_{shift})\bmod M)$ is frequency domain data with an index $(k-Q_{shift})\bmod M$ in the M pieces of frequency domain data, and $Q_{shift}$ is the shift length.

In an embodiment, $Q_{shift}=\lfloor M\times A/h\rfloor$, where A and h are integers. In the foregoing manner, a cyclic shift is performed on frequency domain data $d_{fre}$ with a length of M to obtain shifted frequency domain data $d_{shift}$ with a length of M. A shift length of the cyclic shift is determined by the length M. In this way, modulated data with different lengths has corresponding shift lengths, so that a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end. In addition, with the foregoing embodiment, a PAPR of modulated data with any length can be reduced. For example, the length of the modulated data is an odd number, for example, M=3, M=5, M=7, or M=9.

In an embodiment, A may be equal to 1, −1, 3, or −3, and h may be equal to 4.

In an embodiment, inverse Fourier transform may be performed on the M pieces of shifted frequency domain data to obtain the time domain data.

In an embodiment, alternatively, frequency domain filtering and inverse Fourier transform may be sequentially performed on the M pieces of shifted frequency domain data to obtain the time domain data.

In an embodiment, a frequency domain filter for the frequency domain filtering is determined based on an initial filter including K×M filter coefficients, and the frequency domain filter includes M filter coefficients. With the foregoing embodiment, an extraction operation is performed on the initial filter to obtain the frequency domain filter. The generated frequency domain filter is orthogonal. When frequency domain filtering is performed on the M pieces of frequency domain data, interference caused by the frequency domain filtering operation can be reduced. Therefore, during ideal channel estimation with a known noise, a network device can correctly demodulate the modulated data.

In an embodiment, the M filter coefficients may be extracted from the K×M filter coefficients in the initial filter at a step of K to obtain the frequency domain filter. With the frequency domain filter obtained in the foregoing embodiment, comparatively small interference may be caused when frequency domain filtering is performed. Therefore, during ideal channel estimation with a known noise, a network device can correctly demodulate the modulated data.

In an embodiment, a location, in the initial filter, of a filter coefficient with an index m in the frequency domain filter may satisfy the following formula:

$$S_{filter}(m)=S_{base}((A\times K\times M/h)\bmod K+m\times K), \text{ where}$$

$S_{filter}(m)$ indicates the filter coefficient with the index m in the frequency domain filter coefficients, $S_{base}((A \times K \times M/h) \bmod K + m \times K)$ indicates a filter coefficient with an index $(A \times K \times M/h) \bmod K + m \times K$ in the initial filter, and A and h are integers.

In an embodiment, K may be determined based on M. In the foregoing embodiment, K is determined based on the length M of the modulated data, so that the frequency domain filter obtained through extraction by using K has comparatively good orthogonality, thereby reducing interference caused when the frequency domain filter performs frequency domain filtering.

In an embodiment, K may be $K=4 \times B/\gcd(M, 4)$, where $\gcd(M, 4)$ means taking a greatest common divisor of M and 4, and B is a positive integer.

In an embodiment, a frequency domain filter coefficient for the frequency domain filtering may be alternatively determined based on signaling from a network device.

In an embodiment, alternatively, inverse Fourier transform and time domain filtering may be sequentially performed on the M pieces of shifted frequency domain data to obtain the time domain data.

In an embodiment, a time domain filter coefficient for the time domain filtering may be determined based on signaling from a network device.

In an embodiment, a time domain filter for the time domain filtering may be obtained by performing inverse Fourier transform on the frequency domain filter. In the foregoing embodiment, an extraction operation is performed on the initial filter to obtain the frequency domain filter. Then inverse Fourier transform is performed on the frequency domain filter to obtain the time domain filter. The time domain filter can reduce interference caused during time domain filtering. Therefore, during ideal channel estimation with a known noise, a network device can correctly demodulate the modulated data.

In an embodiment, the M pieces of modulated data are BPSK modulated data.

According to a third aspect, an embodiment of this application provides an apparatus. The apparatus may be a transmit end, or may be an apparatus in a transmit end, or may be another apparatus that can implement corresponding functions performed by the transmit end in any design example of the first aspect. The apparatus may include a phase rotation module, a determining module, and a sending module. These modules may perform corresponding functions performed by the transmit end in any design example of the first aspect. Details are as follows.

The phase rotation module is configured to separately perform phase rotation on M pieces of modulated data to obtain M pieces of phase-rotated data, where a phase factor used for performing phase rotation on the M pieces of modulated data is determined based on M.

The determining module is configured to determine time domain data based on the M pieces of phase-rotated data.

The sending module is configured to send the time domain data to a receive end.

In an embodiment, the phase rotation module may be specifically configured to perform phase rotation on modulated data with an index m in the M pieces of modulated data based on a phase factor corresponding to the modulated data with the index m, where m traverses 0 to M−1, and m is an integer. The phase factor corresponding to the modulated data with the index m is:

$$e^{j \times \varphi_m} = e^{j2\pi \times m \times \lfloor M \times A/h \rfloor / M}, \text{ where}$$

$e^{j \times \varphi_m}$ is the phase factor corresponding to the modulated data with the index m, and A and h are integers.

In an embodiment, the determining module may be specifically configured to sequentially perform Fourier transform, frequency domain filtering, and inverse Fourier transform on the M pieces of phase-rotated data to obtain the time domain data. A frequency domain filter for the frequency domain filtering is determined based on an initial filter including $K \times M$ filter coefficients, and the frequency domain filter includes M filter coefficients.

In an embodiment, the determining module may be further configured to determine the frequency domain filter based on the initial filter including the $K \times M$ filter coefficients.

In an embodiment, when determining the frequency domain filter for the frequency domain filtering based on the initial filter including the $K \times M$ filter coefficients, the determining module may be specifically configured to extract the M filter coefficients from the $K \times M$ filter coefficients in the initial filter at a step of K to obtain the frequency domain filter.

In an embodiment, a location, in the initial filter, of a filter coefficient with an index m in the frequency domain filter satisfies the following formula:

$$S_{filter}(m) = S_{base}((A \times K \times M/h) \bmod K + m \times K), \text{ where}$$

$S_{filter}(m)$ indicates the filter coefficient with the index m in the frequency domain filter coefficients, $S_{base}((A \times K \times M/h) \bmod K + m \times K)$ indicates a filter coefficient with an index $(A \times K \times M/h) \bmod K + m \times K$ in the initial filter, and A and h are integers.

In an embodiment, K may be determined based on M.

In an embodiment, when determining the time domain data based on the M pieces of phase-rotated data, the determining module may be further specifically configured to sequentially perform Fourier transform, inverse Fourier transform, and time domain filtering on the M pieces of phase-rotated data to obtain the time domain data. A time domain filter coefficient for the time domain filtering is determined based on signaling from a network device.

In an embodiment, the M pieces of modulated data may be BPSK modulated data.

According to a fourth aspect, an embodiment of this application provides an apparatus. The apparatus may be a transmit end, or may be an apparatus in a transmit end, or may be another apparatus that can implement corresponding functions performed by the transmit end in any design example of the second aspect. The apparatus may include a Fourier transform module, a cyclic shift module, a determining module, and a sending module. These modules may perform corresponding functions performed by the transmit end in any design example of the second aspect. Details are as follows.

The Fourier transform module is configured to perform Fourier transform on M pieces of modulated data to obtain M pieces of frequency domain data.

The cyclic shift module is configured to perform a cyclic shift on the M pieces of frequency domain data to obtain M pieces of shifted frequency domain data, where a shift length for performing the cyclic shift on the frequency domain data is determined based on M.

The determining module is configured to determine time domain data based on the M pieces of shifted frequency domain data.

The sending module is configured to send the time domain data to a receive end.

In an embodiment, shifted frequency domain data with an index k in the M pieces of shifted frequency domain data may satisfy the following formula, where k traverses 0 to M−1, and k is an integer:

$$d_{shift}(k)=d_{fre}((k-Q_{shift})\bmod M), \text{ where}$$

$d_{shift}(k)$ is the shifted frequency domain data with the index k in the M pieces of shifted frequency domain data, $d_{fre}((k-Q_{shift})\bmod M)$ is frequency domain data with an index $(k-Q_{shift})\bmod M$ in the M pieces of frequency domain data, $Q_{shift}$ is the shift length, and $Q_{shift}$ satisfies the following formula:

$$Q_{shift}=\lfloor M\times A/h \rfloor, \text{ where}$$

A and h are integers.

In an embodiment, the determining module may be specifically configured to sequentially perform frequency domain filtering and inverse Fourier transform on the M pieces of shifted frequency domain data to obtain the time domain data. A frequency domain filter for the frequency domain filtering is determined based on an initial filter including K×M filter coefficients, and the frequency domain filter includes M filter coefficients.

In an embodiment, the determining module may be further configured to determine the frequency domain filter based on the initial filter including the K×M filter coefficients.

In an embodiment, when determining the frequency domain filter for the frequency domain filtering based on the initial filter including the K×M filter coefficients, the determining module may be specifically configured to extract the M filter coefficients from the K×M filter coefficients in the initial filter at a step of K to obtain the frequency domain filter.

In an embodiment, a location, in the initial filter, of a filter coefficient with an index m in the frequency domain filter satisfies the following formula:

$$S_{filter}(m)=S_{base}((A\times K\times M/h)\bmod K+m\times K), \text{ where}$$

$S_{filter}(m)$ indicates the filter coefficient with the index m in the frequency domain filter coefficients, $S_{base}((A\times K\times M/h)\bmod K+m\times K)$ indicates a filter coefficient with an index $(A\times K\times M/h)\bmod K+m\times K$ in the initial filter, and A and h are integers.

In an embodiment, K may be determined based on M.

In an embodiment, when determining the time domain data based on the M pieces of shifted frequency domain data, the determining module may be further specifically configured to sequentially perform inverse Fourier transform and time domain filtering on the M pieces of shifted frequency domain data to obtain the time domain data. A time domain filter coefficient for the time domain filtering is determined based on signaling from a network device.

In an embodiment, the M pieces of modulated data may be BPSK modulated data.

According to a fifth aspect, an embodiment of this application further provides an apparatus. The apparatus includes a processor, configured to implement functions of the transmit end in the method described in the first aspect or the second aspect. The apparatus may further include a memory, configured to store program instructions and data. The memory is coupled to the processor, and the processor may invoke and execute the program instructions stored in the memory, to implement the functions of the transmit end in the method described in the first aspect or the second aspect. The apparatus may further include a communications interface, and the communications interface is used for the apparatus to communicate with another device. For example, the another device is a network device. For example, the communications interface may be a transceiver, a circuit, a bus, a bus interface, or another apparatus that can implement a communication function. This is not limited in this application.

In an embodiment, the apparatus includes: a memory, configured to store program instructions; a processor, configured to separately perform phase rotation on M pieces of modulated data to obtain M pieces of phase-rotated data, where a phase factor for performing phase rotation on the M pieces of modulated data is determined based on M, and determine time domain data based on the M pieces of phase-rotated data; and a communications interface, configured to send the time domain data to a receive end.

In an embodiment, for a specific process of separately performing phase rotation on the M pieces of modulated data by the processor and a specific process of determining the time domain data by the processor based on the M pieces of phase-rotated data, refer to the specific descriptions of separately performing phase rotation on the M pieces of modulated data and determining the time domain data based on the M pieces of phase-rotated data in the first aspect. This is not specifically limited herein again.

In an embodiment, the apparatus includes: a memory, configured to store program instructions; a processor, configured to perform Fourier transform on M pieces of modulated data to obtain M pieces of frequency domain data, perform a cyclic shift on the M pieces of frequency domain data to obtain M pieces of shifted frequency domain data, where a shift length used for performing the cyclic shift on the frequency domain data is determined based on M, and determine time domain data based on the M pieces of shifted frequency domain data; and a communications interface, configured to send the time domain data to a receive end.

In an embodiment, for a specific process of performing Fourier transform on the M pieces of modulated data by the processor, a specific process of performing the cyclic shift on the M pieces of frequency domain data by the processor, and a specific process of determining the time domain data by the processor based on the M pieces of shifted frequency domain data, refer to the specific descriptions of performing Fourier transform on the M pieces of modulated data, performing the cyclic shift on the M pieces of frequency domain data, and determining the time domain data based on the M pieces of shifted frequency domain data in the second aspect. This is not specifically limited herein again.

According to a sixth aspect, an embodiment of this application further provides a computer-readable storage medium including instructions. When the instructions are run on a computer, the computer is enabled to perform the method in any design of the first aspect, or the computer is enabled to perform the method in any design of the second aspect.

According to a seventh aspect, an embodiment of this application provides a chip system. The chip system includes a processor and may further include a memory, and is configured to implement functions of the transmit end in the foregoing methods. The chip system may include a chip, or may include a chip and another discrete device.

According to an eighth aspect, an embodiment of this application provides a system. The system includes the transmit end and/or the receive end in the first aspect or the second aspect.

According to a ninth aspect, this application further provides a computer program product including instructions.

When the computer program product is run on a computer, the computer is enabled to perform the methods in the foregoing aspects.

DESCRIPTION OF EMBODIMENTS

To make the objectives, technical solutions, and advantages of this application clearer, the following further describes this application in detail with reference to the accompanying drawings.

A signal transmission method provided in the embodiments of this application may be applied to a communications system. The communications system in the embodiments of this application may be various communications systems, for example, long term evolution (LTE), LTE-Advanced, a new radio (NR) system, narrowband IoT (narrowband internet of things, NB-IoT), or an enhanced machine type communication (eMTC) system; or may be a hybrid architecture of a plurality of communications systems, for example, a hybrid architecture of LTE and 5G. NR may also be referred to as a fifth-generation mobile communications system.

Figure 2:
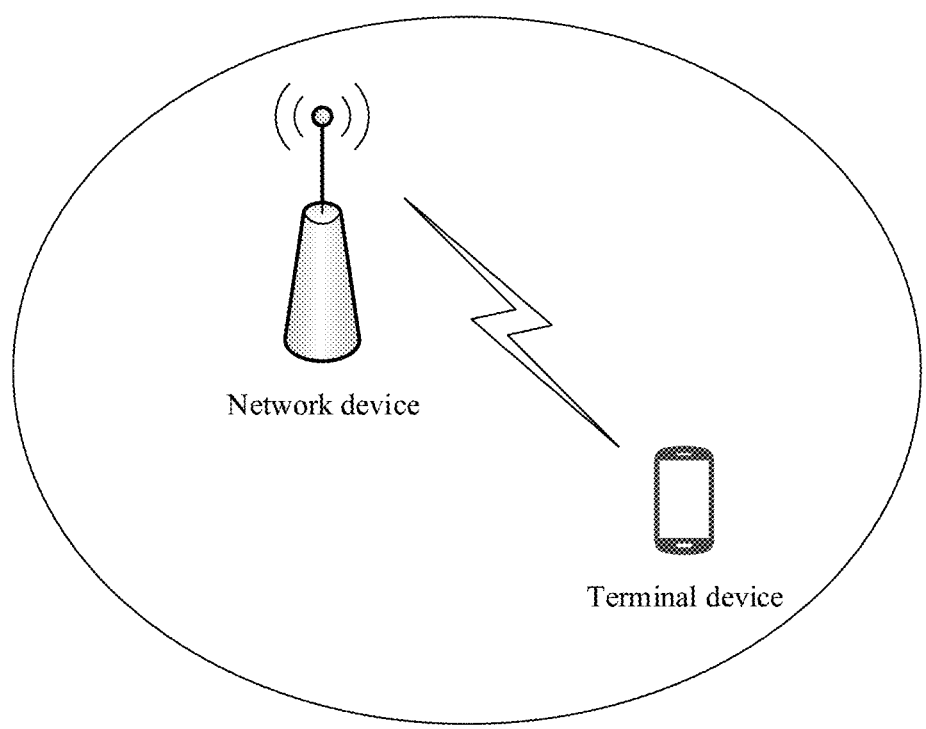
FIG. 2 is a schematic architectural diagram of a communications system according to this application.

An architecture of the communications system in the embodiments of this application may include communications devices, as shown in FIG. 2. The communications devices may include a network device and a terminal device. The network device may also be referred to as a network-side device. The communications devices may perform wireless communication by using an air interface resource. The air interface resource may include at least one of a time domain resource, a frequency domain resource, a code resource, and a space resource. In the embodiments of this application, "at least one" may also be described as "one or more", and "plurality" may be two, three, four, or more. This is not limited in this application.

The technical solutions provided in the embodiments of this application may be applied to wireless communication between communications devices. The wireless communication between the communications devices may include wireless communication between a network device and a terminal device, wireless communication between network devices, and wireless communication between terminal devices. In the embodiments of this application, the term "wireless communication" may also be referred to as "communication" for short, and the term "communication" may also be described as "data transmission", "signal transmission", "information transmission", "transmission", or the like. In the embodiments of this application, transmission may include sending or receiving. For example, the transmission may be uplink transmission, for example, a terminal device may send a signal to a network device; or the transmission may be downlink transmission, for example, a network device may send a signal to a terminal device.

The terminal device in the embodiments of this application may also be referred to as a terminal, and may be a device with a wireless sending/receiving function. The terminal may be deployed on land, including an indoor or outdoor scenario and a handheld or vehicle-mounted scenario, or may be deployed on water (for example, on a steamship), or may be deployed in the air (for example, on an airplane, a balloon, or a satellite). The terminal device may be user equipment (UE). The UE includes a handheld device, a vehicle-mounted device, a wearable device, or a computing device that has a wireless communication function. For example, the UE may be a mobile phone, a tablet computer, or a computer with a wireless sending/receiving function. Alternatively, the terminal device may be a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in a smart city, a wireless terminal in a smart home, or the like. In the embodiments of this application, an apparatus configured to implement a function of a terminal may be the terminal, or may be an apparatus that can support the terminal in implementing the function, for example, a chip system. In the embodiments of this application, the chip system may include a chip, or may include a chip and another discrete device. In the technical solutions provided in the embodiments of this application, the technical solutions provided in the embodiments of this application are described by using an example in which an apparatus configured to implement a function of a terminal is the terminal, and the terminal is UE.

The network device in the embodiments of this application includes a base station (BS). The base station may be a device that is deployed in a radio access network and that can wirelessly communicate with a terminal. The base station may be in a plurality of forms, for example, a macro base station, a micro base station, a relay station, and an access point. For example, the base station in the embodiments of this application may be a base station in 5G or a base station in LTE. The base station in 5G may also be referred to as a transmission reception point (TRP) or a gNB (gNodeB). In the embodiments of this application, an apparatus configured to implement a function of a network device may be the network device; or may be an apparatus that can support the network device in implementing the function, for example, a chip system. In the technical solutions provided in the embodiments of this application, the technical solutions provided in the embodiments of this application are described by using an example in which an apparatus configured to implement a function of a network device is the network device, and the network device is a base station.

When the technical solutions provided in the embodiments of this application are used in a communications system, the technical solutions may be applied to various access technologies. For example, the technical solutions may be applied to an orthogonal multiple access (OMA) technology or a non-orthogonal multiple access (NOMA) technology. When the technical solutions are applied to an orthogonal multiple access technology, the technical solutions may be applied to orthogonal frequency division multiple access (OFDMA), single carrier frequency division multiple access (SC-FDMA), or other technologies. This is not limited in the embodiments of this application. When the technical solutions are applied to a non-orthogonal multiple access technology, the technical solutions may be applied to sparse code multiple access (SCMA), multi-user shared access (MUSA), pattern division multiple access (PDMA), interleave-grid multiple access (IGMA), resource spreading multiple access (RSMA), non-orthogonal coded multiple access (NCMA), non-orthogonal coded access (NOCA), or other technologies. This is not limited in the embodiments of this application.

When the technical solutions provided in the embodiments of this application are used in a communications system, the technical solutions may be applied to various types of scheduling. For example, the technical solutions may be applied to grant-based scheduling or grant-free scheduling. When the technical solutions are applied to grant-based scheduling, a network device may send scheduling information to a terminal device by using dynamic signaling. The scheduling information carries a transmission parameter. The network device and the terminal device perform data transmission based on the transmission parameter. When the technical solutions are applied to grant-free scheduling, scheduling information may be preconfigured, or a network device may send scheduling information to a terminal device by using semi-static signaling. The scheduling information carries a transmission parameter. The network device and the terminal device perform data transmission based on the transmission parameter. The grant-free scheduling may also be referred to as non-dynamic scheduling, a non-dynamic grant, or another name. This is not limited in the embodiments of this application.

Figure 1:
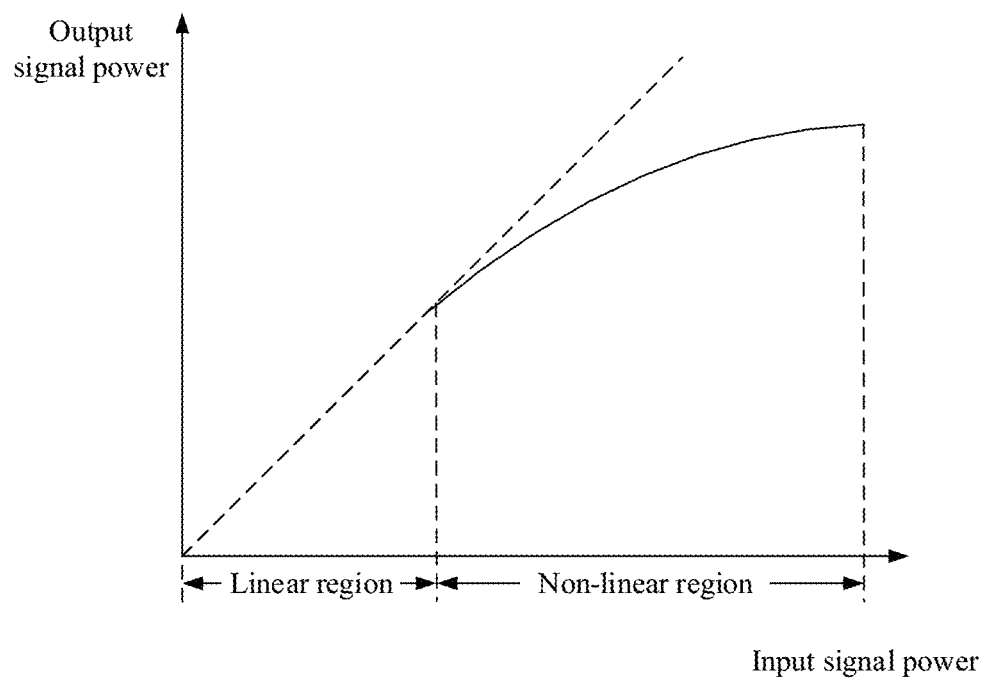
FIG. 1 is a schematic diagram of an amplification function of a PA according to this application.

In a communications system, when a transmit end sends data to a receive end, the transmit end generates time domain data based on to-be-sent bit data, and the time domain data may be amplified by a PA and then sent to the receive end. A function of amplifying a signal by the PA includes a linear region and a non-linear region. As shown in FIG. 1, when a power of an input signal is comparatively low, the input signal corresponds to the linear region of the PA; or when a power of an input signal is comparatively high, the input signal corresponds to the non-linear region of the PA. In the linear region, an amplification gain of the PA is a constant, that is, a power ratio of the pre-amplification input signal to an amplified output signal is a constant, and phases of the input signal and the output signal are the same. In the non-linear region, an amplification gain of the PA decreases with an increase in the power of the input signal, and the PA even has no amplification effect.

During sending of the time domain data, if all waveforms of the time domain data are located in the linear region of the PA, because the amplification gain of the PA in the linear region is a constant, amplification gains of all the waveforms of the time domain data are the same after the time domain data is amplified by the PA. Therefore, after the time domain data is amplified by the PA, a waveform distortion is comparatively small. If all or some waveforms of the time domain data are located in the non-linear region of the PA, because the amplification gain of the PA in the non-linear region decreases with an increase in the power of the input signal, and amplitudes at different sampling points of the time domain data are different, amplification gains at different sampling points of the time domain data are different, thereby causing a waveform distortion of the time domain data after the time domain data is amplified by the PA. The waveform distortion causes an increase in out-of-band (OOB) leakage and deterioration of out-of-band performance, and introduces interference, thereby increasing an error vector magnitude (EVM). A waveform distortion degree of the time domain data is directly proportional to a PAPR of the time domain data. To be specific, a higher PAPR of the time domain data indicates a more serious distortion exerted on the time domain data after the time domain data undergoes non-linear PA.

Figure 3:
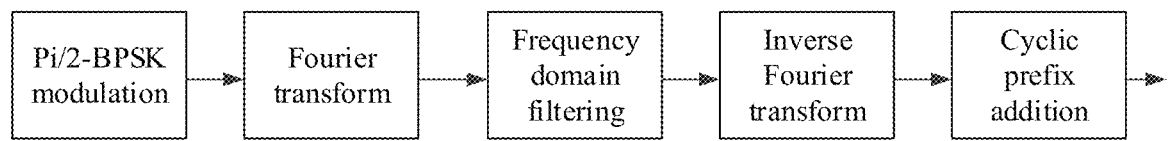
FIG. 3 is a schematic diagram of a signal transmission method according to this application.

In a possible implementation, a transmit end sends a signal by using a single carrier frequency domain multiple access (SC-FDMA) waveform obtained through Pi/2-binary phase shift keying (BPSK) modulation. To be specific, as shown in FIG. 3, modulated data obtained through Pi/2-BPSK modulation is used as to-be-sent data, Fourier transform is performed on the to-be-sent data to obtain frequency domain data, and then frequency domain filtering, resource mapping, and inverse Fourier transform are performed on the frequency domain data to obtain time domain data, that is, the to-be-sent data generates the SC-FDMA waveform and is filtered by using a filter, where the filtering may be alternatively time domain filtering. A PAPR of the signal can be reduced to approximately 2 dB by sending the signal by using the SC-FDMA waveform obtained through Pi/2-BPSK modulation. However, in some scenarios, reducing a PAPR of a signal to approximately 2 dB does not satisfy a system requirement.

Based on this, the embodiments of this application provide a signal transmission method and apparatus. Phase rotation is performed on modulated data, and when phase rotation is performed on the modulated data, a phase factor for performing phase rotation is determined by a length of the modulated data, so that a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end. For example, a PAPR of output data obtained through frequency domain filtering may be less than 2 dB after the output data is converted to time domain. The method and the apparatus are based on a same invention concept. Because problem-resolving principles of the method and the apparatus are similar, mutual reference may be made to implementations of the apparatus and the method, and repeated content is not described in detail.

It should be noted that, in the embodiments of this application, "plurality" means at least two. The term "and/or" describes an association relationship between associated objects and represents that three relationships may exist. For example, A and/or B may represent the following three cases: Only A exists, both A and B exist, and only B exists. The character "/" generally indicates an "or" relationship between associated objects. In addition, it should be understood that, in the embodiments of this application, for a type of technical feature, technical features in the type of technical feature are distinguished by using "first", "second", "third", "A", "B", "C", "D", and the like. There is no chronological order or order of size between the technical features described by using the "first", "second", "third", "A", "B", "C", and "D".

Signaling in the embodiments of this application may be semi-static signaling, or may be dynamic signaling. The semi-static signaling may be radio resource control (RRC) signaling, a broadcast message, a system message, a medium access control (MAC) control element (CE), or the like. The broadcast message may include remaining minimum system information (RMSI). The dynamic signaling may be physical layer signaling. The physical layer signaling may be signaling carried on a physical control channel or signaling carried on a physical data channel. The physical data channel may be a downlink channel, for example, a physical downlink shared channel (PDSCH). The physical control channel may be a physical downlink control channel (PDCCH), an enhanced physical downlink control channel (EPDCCH), a narrowband physical downlink control channel (NPDCCH), or a machine type communication physical downlink control channel (MTC PDCCH, MPDCCH). The signaling carried on the PDCCH or the EPDCCH may also be referred to as downlink control information (DCI). The physical control channel may also be a physical sidelink control channel, and signaling carried on the physical sidelink control channel may also be referred to as sidelink control information (SCI).

To make the embodiments of this application easier to understand, the following first illustrates some descriptions in the embodiments of this application. These descriptions should not be construed as a limitation on the protection scope claimed by the present invention.

Symbol: A symbol generally includes a cyclic prefix (CP) and time domain data of a time period. For example, a symbol may be expressed as s(t), and duration is $(N_{cp}+N) \cdot T_s$. Assuming that $0 \leq t < (N_{cp}+N) \cdot T_s$, time domain data that is in s(t) and that has a time range of $0 \leq t < N_{cp} \cdot T_s$ may be considered as a CP, and time domain data that is in s(t) and that has a time range of $N_{cp} \cdot T_s \leq t < (N_{cp}+N) \cdot T_s$ is time domain data of a time period $N \cdot T_s$, where $T_s$ is a time unit factor. For example, $T_s$ may be a time interval between two pieces of adjacent discrete data in discrete data obtained by performing discrete sampling on consecutive time domain output data s(t). For example, in an LTE system, when N=2048, $N_{cp}$ is 160 or 144, and $T_s$ is 1/(15000×2048) seconds, a symbol includes a cyclic prefix and time domain data with a duration of approximately 66.7 microseconds.

Resource element (RE): A resource element is a minimum physical resource, and is generally a minimum resource for carrying data. One resource element corresponds to one subcarrier in frequency domain, and corresponds to one symbol in time domain, that is, is located in one symbol. Therefore, a location of a resource element may be determined by using a symbol index and a subcarrier index. Generally, one RE may carry one piece of complex data. For example, for an orthogonal frequency division multiplexing (OFDM) waveform, one RE carries one piece of modulated data; and for an SC-FDMA waveform, one RE carries one piece of data in output data obtained by performing Fourier transform on modulated data.

Resource block (RB): A resource block is a set of a plurality of resource elements. A resource block generally includes a plurality of consecutive subcarriers in frequency domain. One resource block may also include a plurality of consecutive symbols in time domain. For example, in an LTE system, one resource block includes 7 or 6 consecutive symbols in time domain, and includes 12 consecutive subcarriers in frequency domain. In other words, one resource block in the LTE system includes 84 or 72 resource elements.

The signal transmission method provided in the embodiments of this application may be applied to a transmit end to send data to a receive end on a channel. Correspondingly, the receive end may receive, on the channel, the data sent by the transmit end. Various possible physical channels or signals may be transmitted on the channel, for example, a broadcast channel (physical broadcast channel, PBCH), a primary synchronization signal (PSS), a secondary synchronization signal (SSS), a physical downlink shared channel (PDSCH), a physical downlink control channel (PDCCH), a physical uplink shared channel (PUSCH), a physical uplink control channel (PUCCH), various types of uplink reference signals (RS), various types of downlink RSs, or other possible physical channels. This is not limited in the embodiments of this application. The signal transmission method provided in the embodiments of this application may be applied to uplink communication or downlink communication.

The following describes in detail the signal transmission method provided in this application with reference to the accompanying drawings.

Figure 4:
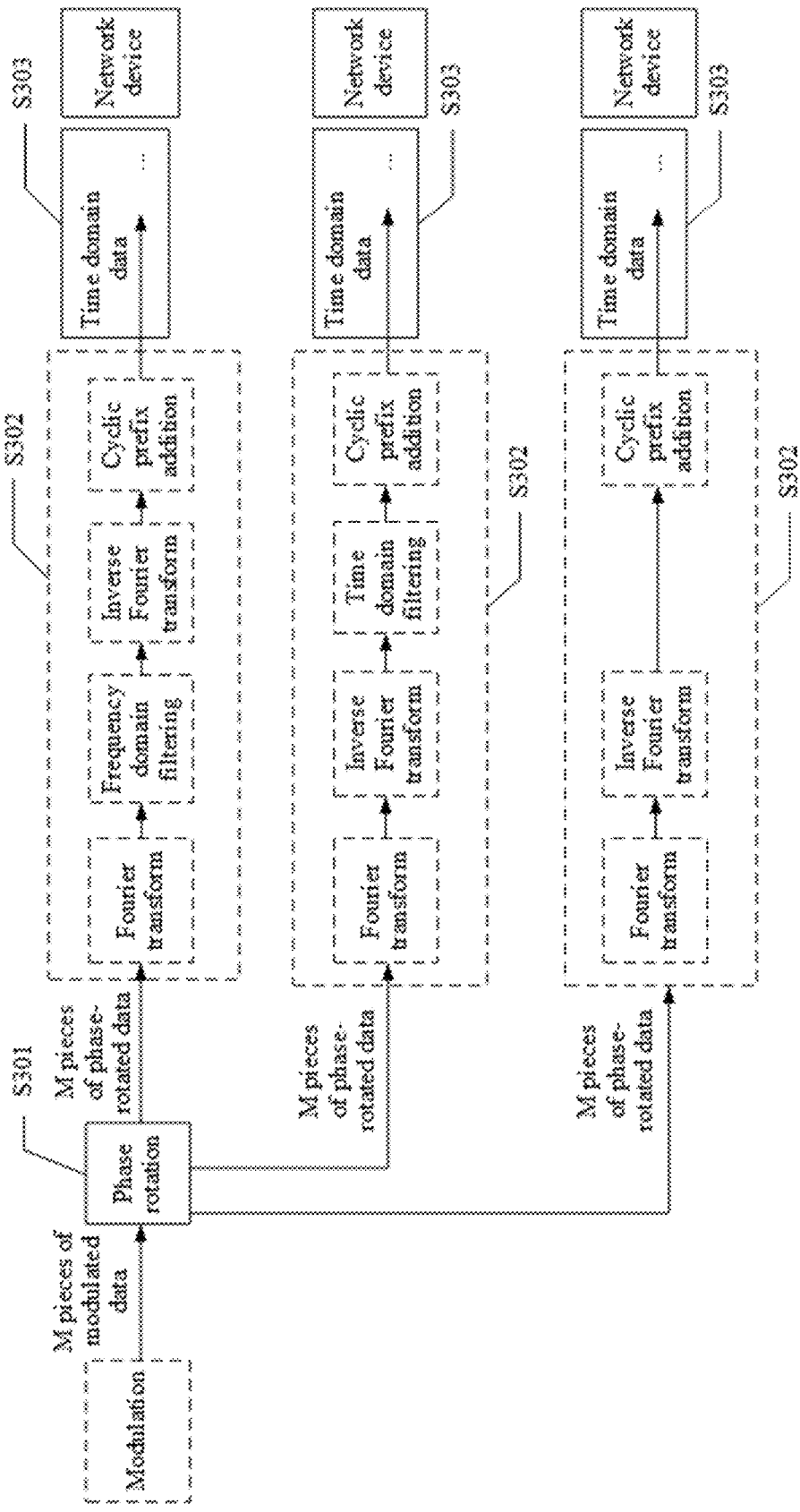
FIG. 4 is a flowchart of a signal transmission method according to this application.

FIG. 4 is a flowchart of a signal transmission method according to an embodiment of this application. The signal transmission method provided in this embodiment of this application may be applied to a transmit end, a chip, a chipset, a functional module that is in a chip and that performs the method, or the like. The transmit end may be a terminal device, or may be a network device. The following describes the signal transmission method provided in this embodiment of this application by using an example in which a transmit end is a terminal device and a receive end is a network device. The method includes the following steps.

S301. A terminal device separately performs phase rotation on M pieces of modulated data to obtain M pieces of phase-rotated data, where a phase factor used for performing phase rotation on the M pieces of modulated data is determined based on a quantity M of pieces of the modulated data. The M pieces of modulated data mean that a length of the modulated data is M. Therefore, the phase factor for performing phase rotation on the M pieces of modulated data may be determined based on the length of the modulated data.

In an implementation, the M pieces of modulated data may be obtained by the terminal device by modulating to-be-sent bit data. The to-be-sent bit data may be obtained in the following processing manner, but not limited thereto: The to-be-sent bit data may be obtained by performing processing such as encoding, interleaving, and scrambling on an original bit stream. The original bit stream may be obtained based on a service to be sent by the terminal device. This is not limited in this embodiment of this application.

For example, a value of M may be equal to a quantity of pieces of modulated data allocated by the terminal device to one symbol, or may be equal to a quantity of subcarriers included in allocated bandwidth. For example, using an OFDM waveform as an example, the terminal device sends data on 10 symbols, and bandwidth allocated to each symbol is 1 RB, that is, 12 subcarriers. Therefore, the 10 symbols correspond to 120 REs. The terminal device may map one piece of modulated data to each RE, and send the modulated data to a network device on the RE. In other words, a quantity of pieces of modulated data transmitted on one symbol is 12, that is, M may be equal to 12. For example, the to-be-sent bit data includes 120 pieces of bit data, and a modulation scheme is BPSK modulation. The terminal device performs BPSK modulation on the 120 pieces of bit data to obtain 120 pieces of modulated data. The 120 pieces of modulated data may be divided into 10 groups, and each group includes 12 pieces of modulated data. The 10 groups of modulated data are in a one-to-one correspondence with modulated data of the 10 symbols. For example, modulated data of a group with an index 0 is modulated data of a symbol with an index 0, modulated data of a group with an index 1 is modulated data of a symbol with an index 1, and so on. In this embodiment of this application, modulated data of each symbol may be separately processed. For ease of description, the following describes this embodiment of this application by using M pieces of modulated data in one symbol as an example. The symbol may be any one of one or more symbols used by the terminal device to transmit data, or the symbol may be any one of symbols included in a plurality of slots or a plurality of subframes of the terminal device.

Optionally, in a communications system, in addition to data, a reference signal (RS) may also be sent in a complete data transmission process, and the reference signal may also be referred to as a pilot signal. The reference signal is a signal known to both the terminal device and the network device, and is mainly used to assist a receive end in demodulating data. Therefore, the reference signal may also be referred to as a demodulation reference signal (DMRS). For example, in an uplink communication process in an LTE system, a single carrier frequency division multiple access (SC-FDMA) waveform is used for sending data, and a Zadoff-Chu sequence (also referred to as a ZC sequence) is used as a reference signal. The reference signal and the data are located in different symbols, and occupy same bandwidth in frequency domain. After the terminal device sends the data and the reference signal, and the network device receives the corresponding data and reference signal, the network device performs operations such as channel estimation and interpolation by using the known reference signal to estimate a channel response of a symbol in which the data is located, and then performs operations such as equalization and demodulation by using the received data and the estimated channel response to obtain the sent data through demodulation.

In this embodiment of this application, the to-be-sent bit data may be unknown data that needs to be demodulated by the network device. Alternatively, the to-be-sent bit data may be a reference signal (for example, a DMRS), and the reference signal is data known to the network device, and is used to assist the network device in demodulating unknown data. The reference signal may be obtained by using a pseudo-random sequence, for example, a Gold sequence or a pseudo-noise (PN) sequence, but not limited thereto. An initial value of the pseudo-random sequence may be preconfigured by the terminal device, or an initial value of the pseudo-random sequence may be obtained by the terminal device according to a predefined rule, or an initial value of the pseudo-random sequence may be determined by the terminal device based on an identifier of the terminal device, or an initial value of the pseudo-random sequence may be notified by the network device to the terminal device by using signaling.

In another possible manner, the M pieces of modulated data in this embodiment of this application may be preconfigured, or may be notified by the network device to the terminal device by using signaling. In this case, the M pieces of modulated data may serve as DMRSs to assist the network device in demodulating unknown data.

For example, a modulation scheme for modulating the M pieces of to-be-sent bit data by the terminal device may be binary phase shift keying (BPSK). Therefore, the obtained M pieces of modulated data are BPSK modulated data. A data feature of the BPSK modulated data is that two pieces of adjacent BPSK modulated data have a same amplitude and a phase difference of 0 or $\pi$. Therefore, if modulated data with an index 0 is 1, modulated data with an index 1 may be 1 or −1, modulated data with an index 2 may be 1 or −1, and so on. That the phase difference between two pieces of adjacent modulated data is 0 or g satisfies BPSK modulation. For example, a correspondence between an input bit of a bit stream and output modulated data corresponding to the input bit may be shown in Table 1 (a) or Table 1 (b).

TABLE 1 (a)

| Input bit of a bit stream | Output modulated data |
|---|---|
| 0 | 1 |
| 1 | −1 |

TABLE 2 (b)

| Input bit of a bit stream | Output modulated data |
|---|---|
| 0 | −1 |
| 1 | 1 |

For example, assuming that a bit stream corresponding to a symbol is [0, 0, 0, 1, 1, 1, 1, 0, 0, 1, 0, 1], output BPSK modulated data obtained according to Table 1 (a) is [1, 1, 1, −1, −1, −1, −1, 1, 1, −1, 1, −1].

In a possible implementation, that the terminal device separately performs phase rotation on the M pieces of modulated data may be implemented in the following manner: The terminal device performs phase rotation on modulated data with an index m in the M pieces of modulated data based on a phase factor corresponding to the modulated data with the index m, where m=0, 1, 2, ..., M−1.

In an implementation, based on the determining, based on the length M of the modulated data, the phase factor corresponding to the modulated data d(m) with the index m may be implemented by using the following formula:

$$e^{j \times \varphi_m} = e^{j2\pi \times m \times \lfloor M \times A/h \rfloor / M}, \text{ where}$$

$e^{j \times \varphi_m}$ is the phase factor corresponding to the modulated data with the index m, A and h are integers, $\lfloor \; \rfloor$ indicates a round-down operation, and values of A and h may be preconfigured on the terminal device, or values of A and h may be obtained by the terminal device according to a predefined rule, or values of A and h may be notified by the network device to the terminal device by using signaling, for example, a value of A may be 1, −1, 3, or −3.

For ease of description, an example in which a value of h is 4 is used below for description.

For example, the terminal device may multiply the modulated data with the index m by the phase factor corresponding to the modulated data with the index m, to obtain phase-rotated data with an index m, that is, $d_{shift}(m) = d(m) \times e^{j \times \varphi_m}$, where $d_{shift}(m)$ is the phase-rotated data with the index m, and d(m) is the modulated data with the index m.

Figure 5:
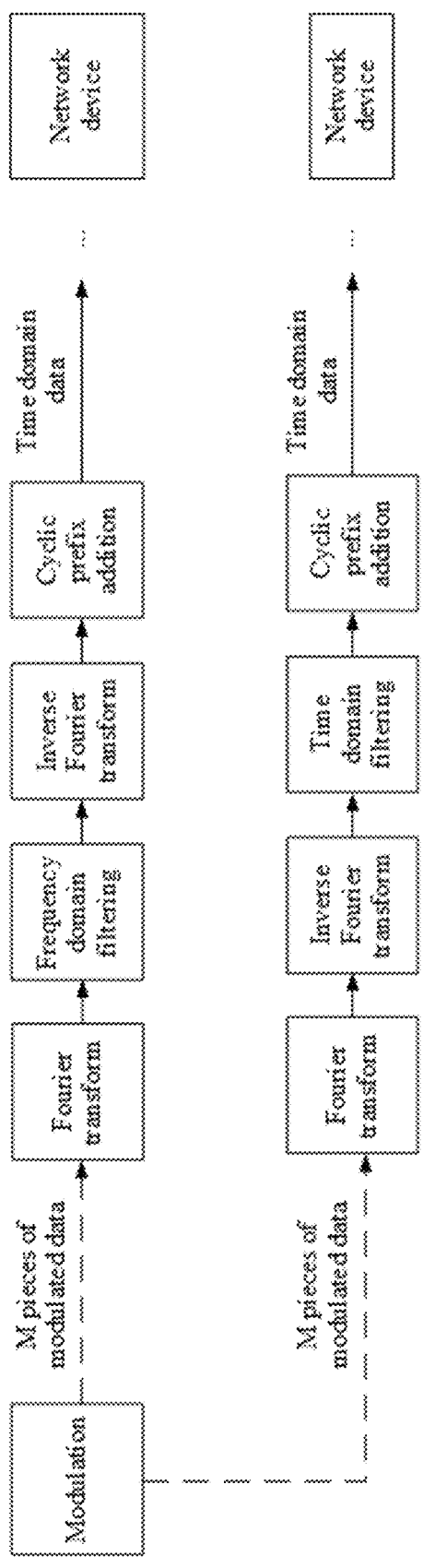
FIG. 5 is a flowchart of a signal transmission method according to this application.

For example, M is equal to 2. If A=1, the phase factor corresponding to the modulated data with the index m is $e^{j \times \varphi_m} = e^{j2\pi \times m \times 0/M}$, and phase factors $[e^{j \times \varphi_0}, e^{j \times \varphi_1}]$ corresponding to two pieces of modulated data may be expressed as [1, 1]. In this case, phase-rotated data obtained by performing phase rotation on the two pieces of modulated data is the same as the modulated data. Therefore, if A=1, phase rotation may not need to be performed on the two pieces of modulated data. When M is equal to 2 and A=1, for a process of sending a signal by the terminal device to the network device, refer to FIG. 5.

For example, M is equal to 3. If A=1, the phase factor corresponding to the modulated data with the index m is $e^{j \times \varphi_m} = e^{j2\pi \times m \times 0/M}$, and phase factors $[e^{j \times \varphi_0}, e^{j \times \varphi_1}, e^{j \times \varphi_2}]$ corresponding to three pieces of modulated data may be expressed as [1, 1, 1]. In this case, phase-rotated data obtained by performing phase rotation on the three pieces of modulated data is the same as the modulated data. Therefore, if A=1, phase rotation may not need to be performed on the three pieces of modulated data. When M is equal to 3 and A=1, for a process of sending a signal by the terminal device to the network device, also refer to FIG. 5.

For example, M is equal to 3. If A=3, the phase factor corresponding to the modulated data with the index m is $e^{j \times \varphi_m} = e^{j2\pi \times m \times 2/M}$, and phase factors $[e^{j \times \varphi_0}, e^{j \times \varphi_1}, e^{j \times \varphi_2}]$ corresponding to three pieces of modulated data may be expressed as $$[e^{j \times 0}, e^{j \times \frac{4\pi}{3}}, e^{j \times \frac{8\pi}{3}}].$$

In this case, phase-rotated data obtained by performing phase rotation on the three pieces of modulated data is different from the modulated data. Therefore, if A=3, phase rotation needs to be performed on the three pieces of modulated data.

For example, M is equal to 6. If A=1, the phase factor corresponding to the modulated data with the index m is $e^{j \times \varphi_m} = e^{j2\pi \times m \times 1/M}$. If A=3, the phase factor is $e^{j \times \varphi_m} = e^{j2\pi \times m \times 4/M}$.

When M can be exactly divided by 4, that is, M mod 4=0, the phase factor corresponding to the modulated data with the index m may be $e^{j \times \varphi_m} = e^{j2\pi \times m \times A/2}$, and phase factors $[e^{j \times \varphi_0}, e^{j \times \varphi_1}, e^{j \times \varphi_2}, \ldots, e^{j \times \varphi_{M-1}}]$ corresponding to the M pieces of modulated data may be expressed as [1, j, −1, −j, . . . ], where j indicates a complex symbol, that is, $j=\sqrt{-1}$.

When M can be exactly divided by 4, that is, M mod 4=0, the phase factor corresponding to the modulated data with the index m may be alternatively expressed as $e^{j \times \varphi_m} = e^{j\pi \times (m \bmod 2)/2}$ or $e^{j \times \varphi_m} = e^{-j\pi \times (m \bmod 2)/2}$ where mod indicates a modulo operation, and m mod 2 means taking a remainder obtained by dividing m by 2, for example, 7 mod 5=2.

In another implementation, the phase factor corresponding to the modulated data with the index m may be alternatively indicated by the network device to the terminal device by using signaling.

In another implementation, when the phase factor corresponding to the modulated data d(m) with the index m is determined, the phase factor may be alternatively determined based on the length M of the modulated data and a symbol index of a symbol corresponding to the M pieces of modulated data. For example, the symbol index of the symbol in which the M pieces of modulated data are located is l. In this case, the phase factor corresponding to the modulated data d(m) with the index m may be alternatively implemented by using the following formula:

$$e^{j \times \varphi_m} = e^{j2\pi \times m \times \lfloor M \times A/h \rfloor / M} \times e^{j\pi \times l/2}$$

In the foregoing manner, phase rotation is performed on the modulated data to obtain the phase-rotated data, and the phase factor for performing phase rotation on the modulated data is determined by the length M of the modulated data. In this way, modulated data with different lengths has corresponding phase factors, so that a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end. In addition, the signal transmission method provided in this embodiment of this application is applicable to BPSK modulated data with all lengths. For example, the length of the modulated data is an odd number, for example, M=3, M=5, M=7, or M=9.

S302. The terminal device determines time domain data based on the M pieces of phase-rotated data.

For example, the terminal device may determine the time domain data in any one of the following three manners.

Figure 6A:
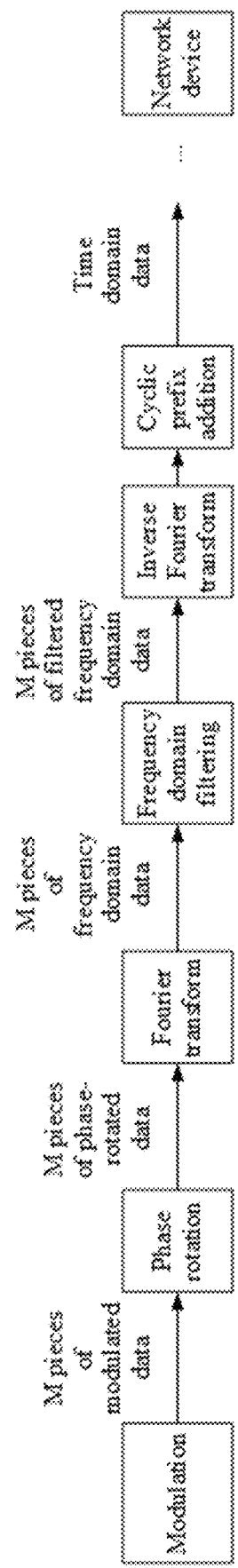
FIG. 6A is a flowchart of determining time domain data according to this application.

As shown in FIG. 6A, a process of a manner 1 is as follows.

A1. The terminal device performs M-point Fourier transform on the M pieces of phase-rotated data to obtain M pieces of frequency domain data, where a length of the Fourier transform may be the same as the length of the modulated data, and both are M. The Fourier transform may be discrete Fourier transform (DFT) or fast Fourier transform (FFT), or may be another form of Fourier transform. This is not specifically limited in this embodiment of this application. For example, this may be implemented by using the following formula:

$$d_{fre}(k) = \frac{1}{\sqrt{M_{scale}^{fft}}} \sum_{m=0}^{M-1} d_{shift}(m) e^{-j2\pi \times k \times m/M},$$

$$k = 0, 1, 2, \ldots, M-1,$$

where $M_{scale}^{fft}$ is a coefficient used to adjust a power of output data obtained through Fourier transform, $M_{scale}^{fft}$ is a real number, for example, $M_{scale}^{fft}$ may be equal to M, and $d_{fre}(k)$ is frequency domain data with an index k.

A2. The terminal device performs frequency domain filtering on the M pieces of frequency domain data to obtain M pieces of filtered frequency domain data. The frequency domain filtering may be implemented in the following manner: The terminal device multiplies the frequency domain data with the index k by a filter coefficient with an index k in a frequency domain filter, to obtain filtered frequency domain data with an index k. For example, the filtered frequency domain data with the index k may be as follows:

$$d_{filter}(k) = d_{fre}(k) \times S_{filter}(k), \text{ where}$$

$d_{filter}(k)$ is the filtered frequency domain data with the index k, $d_{fre}(k)$ is the frequency domain data with the index k, and $S_{filter}(k)$ is the filter coefficient with the index k in the frequency domain filter.

It should be noted that, when all filter coefficients are 1, the M pieces of frequency domain data are the same as the M pieces of filtered frequency domain data. Therefore, when all the filter coefficients are 1, frequency domain filtering may not be performed on the M pieces of frequency domain data.

In an embodiment, the terminal device may determine the frequency domain filter in an initial filter including KXM filter coefficients, where the frequency domain filter includes M filter coefficients. K may be determined based on the length of the modulated data, that is, a length of the frequency domain data, namely, M.

For example, K may be K=4×B/gcd(M, 4), where gcd(M, 4) means taking a greatest common divisor of M and 4, and B is a positive integer. For example, B may be set to 1. In this case, for a specific value of M, a determined value of K is the smallest.

Alternatively, K may be K=4×B/gcd(M, 2), or K may be K=8×B/gcd(M, 8). Certainly, K may be alternatively determined in another manner. Examples are not listed one by one herein.

In an embodiment, the terminal device may extract the M filter coefficients from the K×M filter coefficients in the initial filter at a step of K, to obtain the frequency domain filter. For example, a location, in the initial filter, of a filter coefficient with an index m in the frequency domain filter may satisfy the following formula:

$$S_{filter}(m) = S_{base}((A \times K \times M/h) \bmod K + m \times K), \text{ where}$$

$S_{filter}(m)$ indicates the filter coefficient with the index m in frequency domain filter coefficients, and $S_{base}((A \times K \times M/h) \bmod K + m \times K)$ indicates a filter coefficient with an index $(A \times K \times M/h) \bmod K + m \times K$ in the initial filter.

In the foregoing manner, an extraction operation is performed on the initial filter to obtain the frequency domain filter. The generated frequency domain filter is orthogonal. When frequency domain filtering is performed on the M pieces of frequency domain data, interference caused by the frequency domain filtering operation can be reduced. Therefore, during ideal channel estimation with a known noise, the network device can correctly demodulate the modulated data.

In another embodiment, a coefficient of the frequency domain filter may be alternatively notified by the network device to the terminal device by using signaling.

For example, the terminal device may quantize a filter coefficient. For different filter coefficients, the network device may indicate, by using signaling, quantized values corresponding to the coefficients. For example, the filter coefficient may be represented by an integer place and a decimal place. It is assumed that frequency domain filter coefficients are normalized, and a value of an integer place is 0 or 1. Assuming that signaling indicates one integer place, two decimal places, and a quantization precision of 0.01, a filter coefficient range indicated by the signaling is 0.01 to 1.99. That is, there are $N_{weight}$ possible values for a filter coefficient, where $N_{weight}=200$.

In an embodiment, for any one of the M frequency domain filter coefficients of the frequency domain filter, $\log_2(\lceil N_{weight} \rceil)$ bits of signaling may be used to indicate a value of the coefficient. Therefore, signaling including $M \times \log_2(\lceil N_{weight} \rceil)$ bits is required for the M frequency domain filter coefficients.

In another embodiment, for any one of the M frequency domain filter coefficients, each integer place and each decimal place of the coefficient are separately indicated by using signaling. For example, the frequency domain filter coefficients are normalized, and each coefficient is indicated by using one integer place and two decimal places. If a value of the integer place is 0 or 1, signaling including one bit is required for one integer place. A value of each of the two decimal places is 0 to 9, and signaling including four bits is required for indicating the value of each decimal place.

It should be noted that the integer place, the decimal place, and the quantization precision in the foregoing signaling indication manner are merely examples for description, and other possible values are not excluded.

A3. The terminal device performs inverse Fourier transform on the M pieces of filtered frequency domain data to obtain the time domain data. Further, a cyclic prefix addition operation may be further performed after the inverse Fourier transform is performed. The inverse Fourier transform may be inverse discrete Fourier transform (IDFT) or inverse fast Fourier transform (IFFT), or may be another form of inverse Fourier transform. This is not specifically limited in this embodiment of this application.

In an embodiment, the inverse Fourier transform and the cyclic prefix addition may be implemented by using the following formula:

$$s(t) = \frac{1}{\sqrt{N_{scale}^{ifft}}} \sum_{k=k_{sc}^{start}}^{k_{sc}^{end}} d_{filter}(k - k_{sc}^{start}) e^{j2\pi \cdot \Delta f \cdot (k + k_{re,offset})(t + t_{offset})},$$

where s(t) is data at a moment with an index t in the time domain data, $t_{start} \leq t < t_{end}$, $t_{start}$, t, and $t_{end}$ are real numbers, and $t_{end} - t_{start} = (N + N_{cp}) \times T_s$. For example, $t_{start} = 0$. In this case, $t_{end} = (N + N_{cp}) \cdot T_s$. N is a positive integer. For example, N may be equal to 2048. $T_s$ is a time unit factor. For example, $T_s$ may be a time interval between two pieces of adjacent discrete data in discrete data obtained by performing discrete sampling on the time domain data s(t). $T_s$ may be preconfigured by the terminal device, or $T_s$ may be notified by the network device to the terminal device by using signaling. $N_{cp} \times T_s$ is duration of time domain output data, and $N_{cp} \times T_s$ is duration of a cyclic prefix.

$\Delta f$ is a subcarrier spacing. For example, $\Delta f = 1/(N \cdot T_s) \cdot t_{offset}$ is a delay offset. For example, $t_{off}$ may be $-N_{cp} \cdot T_s$. A value of $t_{offset}$ may be preconfigured by the terminal device; or a value of $t_{offset}$ may be notified by the network device to the terminal device by using signaling. $N_{scale}^{ifft}$ may be a coefficient for adjusting a power of output data in inverse Fourier transform. $N_{scale}^{ifft}$ is a real number. For example, $N_{scale}^{ifft}=1$. $k_{re,offset}$ is a frequency domain offset factor. For example, $k_{re,offset}=1/2$. A value of $k_{re,offset}$ may be preconfigured by the terminal device, or a value of $k_{re,offset}$ may be notified by the network device to the terminal device by using signaling.

$k_{sc}^{start}$ is an index of a starting location of a frequency domain resource to which the M pieces of filtered frequency domain data are mapped, $k_{sc}^{end}$ is an index of an ending location of the frequency domain resource to which the M pieces of filtered data are mapped, and $k_{sc}^{end} - k_{sc}^{start} = M-1$. In an example, $k_{sc}^{start} = -\lfloor M/2 \rfloor$, and $k_{sc}^{end} = \lceil M/2 \rceil - 1$. The index of the starting location of the frequency domain resource and the index of the ending location of the frequency domain resource may be respectively a starting location and an ending location of a subcarrier corresponding to allocated bandwidth. For example, when the allocated bandwidth includes 48 subcarriers, that is, M=48, $q_{sc}^{end} - q_{sc}^{start} = 47$. Assuming that N is 2048, that is, data may be mapped to a maximum of 2048 subcarriers, indexes corresponding to the 2048 subcarriers may be represented as 0, 1, 2, ..., 2047. Therefore, indexes of the 48 subcarriers indicated by $k_{sc}^{start}$ and $k_{sc}^{end}$ may be expressed as $k_{sc}^{start}$ mod N, $(k_{sc}^{start}+1)$ mod N, $(k_{sc}^{start}+2)$ mod N, ..., $(k_{sc}^{start}+47)$ mod N.

If $t_{start}=0$, $t_{end}=(N+N_{cp}) \cdot T_s$, and $t_{offset}=-N_{cp} \cdot T_s$, duration of the time domain data is $(N+N_{cp}) \cdot T_s$. Starting data with a duration of $N_{cp} \cdot T_s$ may be considered as a cyclic prefix of the time domain data. Remaining data, with a length of $N \cdot T_s$, that is obtained by removing the starting data with the duration of $N_{cp} \cdot T_s$ may be considered as time domain output data without the cyclic prefix.

The time domain data is a time-continuous representation form. Assuming that ($t_{start}=0$, $t_{end}=(N+N_{op}) \cdot T_s$, and $t_{offset}=-N_{cp} \cdot T_s$, when discrete sampling is performed on the time domain data based on $t=\tilde{n} \cdot T_s$, $\tilde{n}=0, 1, 2, \ldots, (N+N_{cp})-1$, the following discrete representation form may be obtained by performing discrete sampling on a continuous representation form of inverse Fourier transform:

$$S(\tilde{n} \cdot T_s) = \frac{1}{\sqrt{N_{scale}^{ifft}}} \sum_{k=k_{sc}^{start}}^{k_{sc}^{end}} d_{filter}(k - k_{sc}^{start}) e^{j2\pi \cdot (k+k_{re,offset}) \cdot (\tilde{n}+N_{cp})/N}.$$

The time domain data $s\tilde{n} \cdot T_s)$ in the foregoing discrete representation form includes $N+N_{cp}$ pieces of data, where starting $N_{cp}$ pieces of data may be considered as a cyclic prefix.

Figures 6B, 6C:
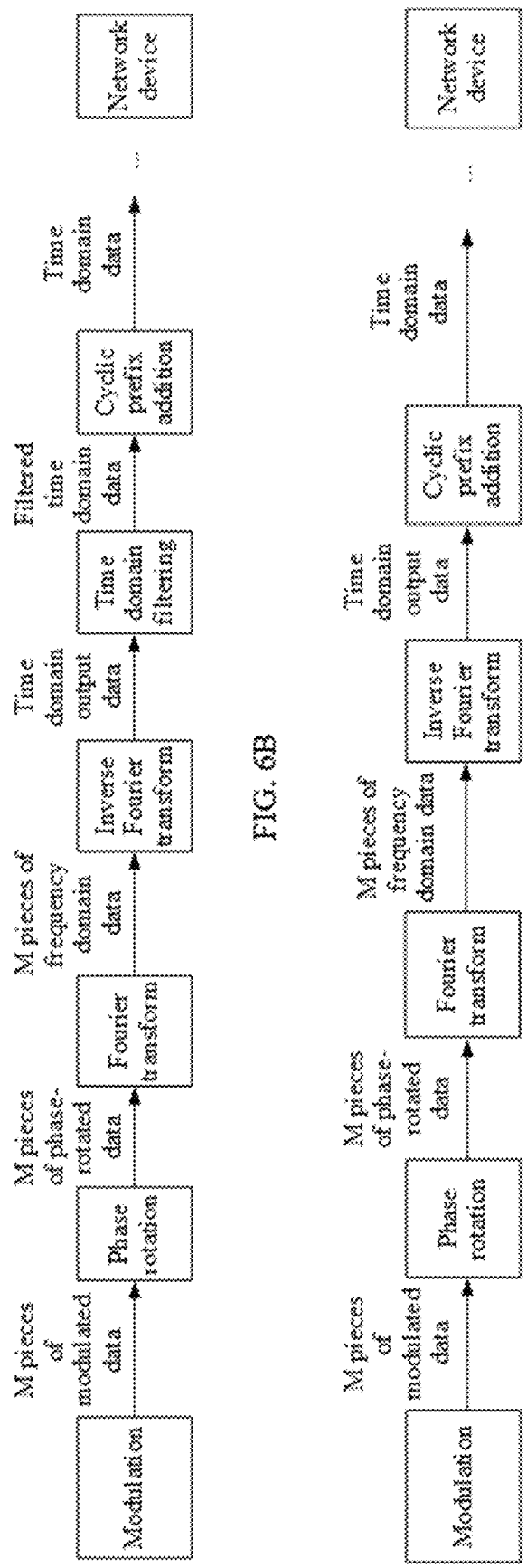
FIG. 6B is another flowchart of determining time domain data according to this application.
FIG. 6C is another flowchart of determining time domain data according to this application.

As shown in FIG. 6B, a process of a manner 2 is as follows.

B1. The terminal device performs M-point Fourier transform on the M pieces of phase-rotated data to obtain M pieces of frequency domain data. For a process of performing M-point Fourier transform on the M pieces of phase-rotated data, refer to the specific descriptions of A1 in the manner 1. Details are not described herein again.

B2. The terminal device performs inverse Fourier transform on the M pieces of frequency domain data to obtain time domain output data. The performing inverse Fourier transform on the M pieces of frequency domain data may be implemented by using the following formula:

$$d_{time}(t) = \frac{1}{\sqrt{N_{scale}^{ifft}}} \sum_{k=k_{sc}^{start}}^{k_{sc}^{end}} d_{fre}(k - k_{sc}^{start}) e^{j2\pi \cdot \Delta f \cdot (k+k_{re,offset}) \cdot (t+t_{offset})},$$

where $d_{time}(t)$ is data at a moment with an index t in the time domain output data, $t_{start} \leq t < t_{end}$, $t_{start}$, t, and $t_{end}$ are real numbers, and $t_{end} - t_{start} = N \cdot T_s$. For example, $t_{start}=0$. In this case, $t_{end}=N \cdot T_s \cdot t_{offset}$ is a delay offset, and a value of $t_{offset}$ may be 0. For parameters such as $\Delta f$, $T_s$, $N_{scale}^{ifft}$, $k_{re,offset}$, $k_{sc}^{start}$ and $k_{sc}^{end}$, refer to the descriptions of parameters such as $\Delta f$, $T_s$, $N_{scale}^{ifft}$, $k_{re,offset}$, $k_{sc}^{start}$ and $k_{sc}^{end}$ in the manner 1. Details are not described herein again.

When $t_{end} - t_{start} = N \cdot T_s$, duration of the time domain output data is $N \cdot T_s$, and the time domain output data does not have a cyclic prefix.

The terminal device performs time domain filtering on the time domain output data with the duration of $N \cdot T_s$ to obtain filtered time domain data with a duration of $N \cdot T_s$. For example, the terminal device may perform circular convolution on the time domain output data and a time domain filter to obtain the filtered time domain data. The frequency domain filter in the manner 1 may be obtained by performing Fourier transform on the time domain filter. For example, $s'_{filter}(t)$ is data at a moment with an index t in a time domain filter $s'_{filter}$, and duration of the time domain filter $s'_{filter}$ is $N_{filter} \cdot T_s$. Discrete sampling is performed on $s'_{filter}$ based on $n' \times T_s$, where $n'=0, 1, 2, \ldots$, and $N_{filter}-1$. Then Fourier transform may be performed to obtain the frequency domain filter $S_{filter}$ in the manner 1. Certainly, the time domain filter in the manner 2 may also be obtained by performing inverse Fourier transform on the frequency domain filter in the manner 1.

Therefore in an embodiment, the time domain filter for the time domain filtering may be obtained by the terminal device by performing inverse Fourier transform on the frequency domain filter. For a manner of determining the frequency domain filter, refer to the manner of determining the frequency domain filter in the manner 1. Details are not described herein again.

In another embodiment, the time domain filter for the time domain filtering may be alternatively determined based on signaling from the network device.

For example, the terminal device may quantize a filter coefficient. For different filter coefficients, the network device may indicate, by using signaling, quantized values corresponding to the coefficients. For example, the filter coefficient may be represented by an integer place and a decimal place. It is assumed that time domain filter coefficients are normalized, a time domain filter obtained through discrete sampling includes $N_{filter}$ coefficients, and a value of an integer place is 0 or 1. Assuming that signaling indicates one integer place, two decimal places, and a quantization precision of 0.01, a filter coefficient range indicated by the signaling is 0.01 to 1.99. That is, there are $N_{weight}$ possible values for a filter coefficient, where $N_{weight}=200$.

In an embodiment, for any one of the $N_{filter}$ time domain filter coefficients of the time domain filter, $\log_2(\lceil N_{weight} \rceil)$ bits of signaling may be used to indicate a value of the coefficient. Therefore, signaling including $N_{filter} \times \log_2(\lceil N_{weight} \rceil)$ bits is required for the $N_{filter}$ time domain filter coefficients.

In another embodiment, for any one of the $N_{filter}$ time domain filter coefficients, each integer place and each decimal place of the coefficient are separately indicated by using signaling. For example, the time domain filter coefficients are normalized, and each coefficient is indicated by using one integer place and two decimal places. A value of the integer place is 0 or 1, and signaling including one bit is required for the integer place. A value of each of the two decimal places is 0 to 9, and signaling including four bits is required for indicating the value of each decimal place.

It should be noted that a time domain filter coefficient may be less than 0. Therefore, for any one of the $N_{filter}$ time domain filter coefficients, additional 1-bit signaling of signaling may be used to indicate whether the coefficient is greater than 0 or less than 0.

The integer place, the decimal place, and the quantization precision in the foregoing signaling indication manner are merely examples for description, and other possible values are not excluded.

B3. The terminal device adds a cyclic shift to the filtered time domain data with the duration of $N \cdot T_s$ to obtain the time domain data.

In an embodiment, ending data with a duration of $N_{cp} \cdot T_s$ in the filtered time domain data is copied to a starting location of the filtered time domain data as a cyclic prefix, to obtain time domain transmit data with a duration of (N $N_{cp}) \cdot T_s$.

As shown in FIG. 6C, a process of a manner 3 is as follows.

C1. The terminal device performs M-point Fourier transform on the M pieces of phase-rotated data to obtain M pieces of frequency domain data. For a process of performing M-point Fourier transform on the M pieces of phase-rotated data, refer to the specific descriptions of A1 in the manner 1. Details are not described herein again.

C2. The terminal device performs inverse Fourier transform on the M pieces of frequency domain data to obtain the time domain data. For a process of performing inverse Fourier transform on the M pieces of frequency domain data, refer to the specific descriptions of B2 in the manner 2. Details are not described herein again.

S303. The terminal device sends the time domain data to the network device.

In an embodiment, before sending the time domain data to the network device, the terminal device may further amplify the time domain data by using a PA.

In this embodiment of this application, when phase rotation is performed on the modulated data, the phase factor for performing phase rotation is determined by the length of the modulated data. In this way, modulated data with different lengths has corresponding phase factors, so that a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end.

Figure 7:
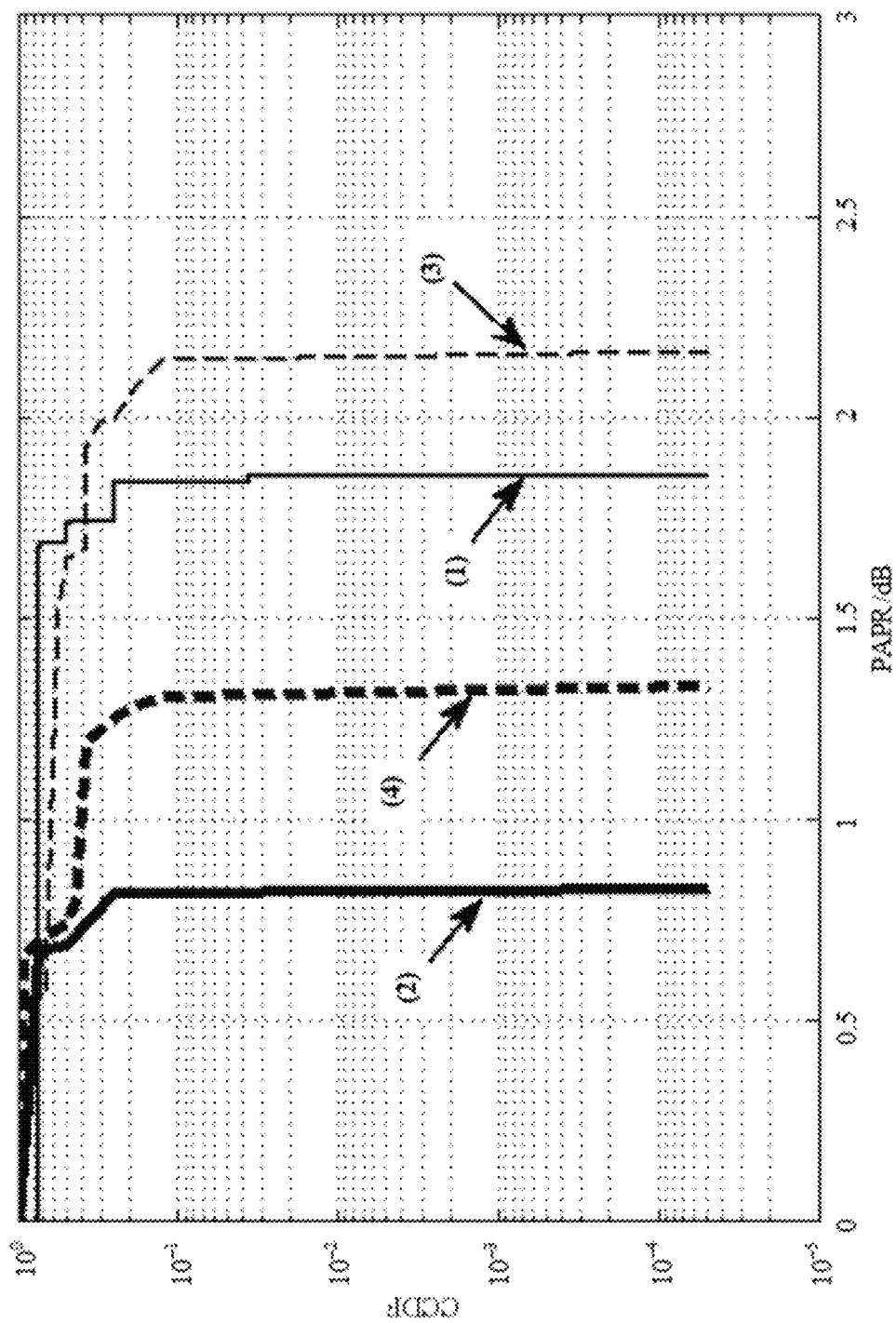
FIG. 7 is a schematic simulation diagram according to this application.

In addition, as shown in FIG. 7, a horizontal axis indicates a PAPR value, and a vertical axis indicates a complementary cumulative distribution function (CCDF). A curve 1 shows a PAPR of an SC-FDMA waveform of three pieces of BPSK modulated data. A curve 2 shows a PAPR of a time domain data waveform, obtained by using the method provided in this embodiment of this application, of three pieces of BPSK modulated data. By comparing the curve 1 with the curve 2, it may be found that the PAPR of the time domain data waveform, obtained by using the method provided in this embodiment of this application, of the three pieces of BPSK modulated data is approximately 1 dB lower than the PAPR of the SC-FDMA waveform of the three pieces of BPSK modulated data.

A curve 3 shows a PAPR of time domain data obtained by performing frequency domain filtering on an SC-FDMA waveform of six pieces of Pi/2-BPSK modulated data by using a frequency domain filter. A curve 4 shows a PAPR of a time domain data waveform, obtained by using the method provided in this embodiment of this application, of six pieces of BPSK modulated data. By comparing the curve 3 with the curve 4, it may be found that the PAPR of the time domain data waveform, obtained by using the method provided in this embodiment of this application, of the six pieces of BPSK modulated data is approximately 0.8 dB lower than the PAPR of the SC-FDMA waveform of the six pieces of Pi/2-BPSK modulated data. It can be learned that, in this embodiment of this application, a phase of modulated data is adjusted based on a phase factor corresponding to a length of the modulated data, so that a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end.

In addition, during frequency domain filtering, an extraction operation is performed on the initial filter to obtain the frequency domain filter, so that the generated frequency domain filter is orthogonal. When frequency domain filtering is performed on the M pieces of frequency domain data, interference caused by the frequency domain filtering operation can be further reduced. Therefore, during ideal channel estimation with a known noise, the network device can correctly demodulate the modulated data.

Figure 8:
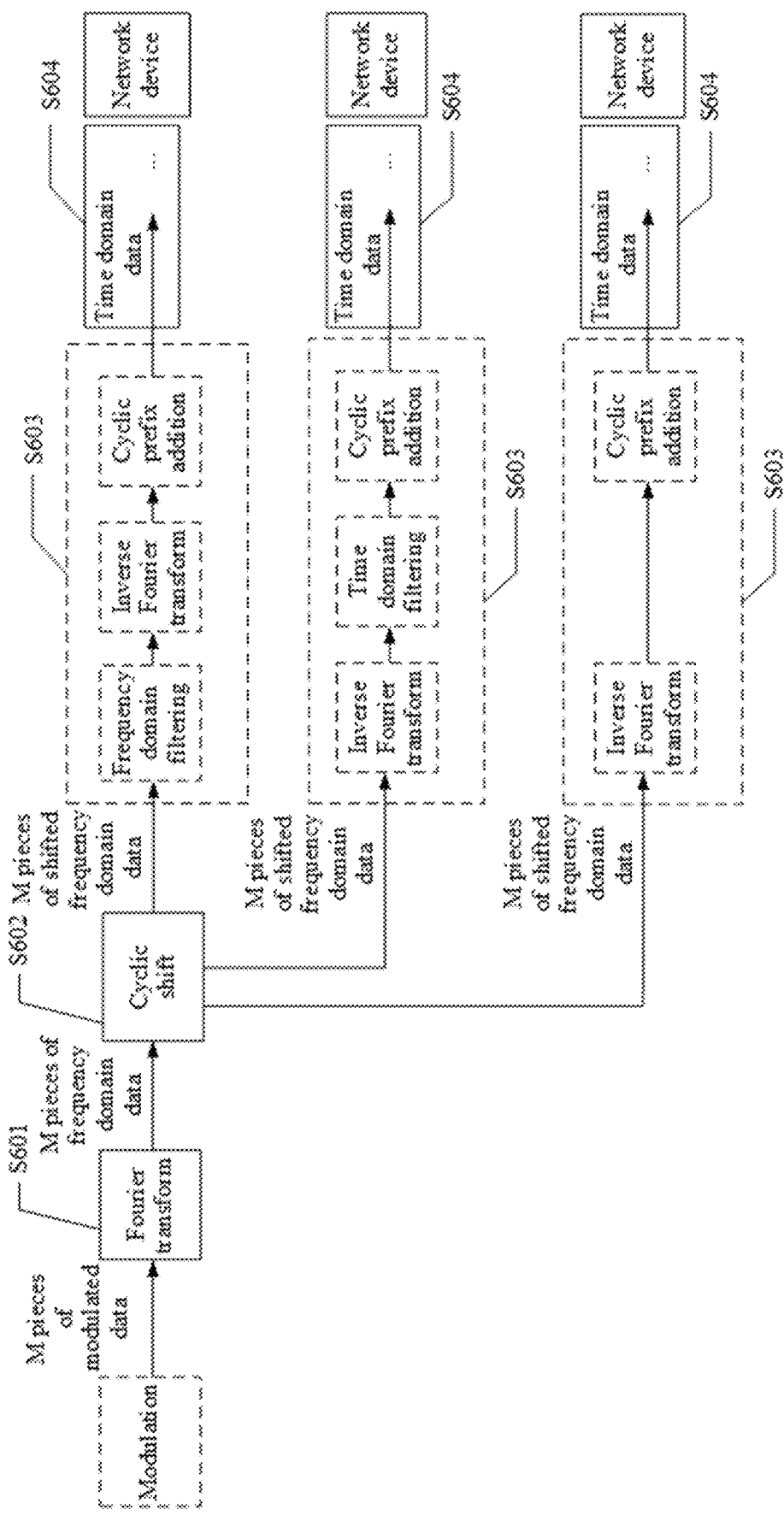
FIG. 8 is a flowchart of another signal transmission method according to this application.

FIG. 8 is a flowchart of another signal transmission method according to an embodiment of this application. The signal transmission method provided in this embodiment of this application may be applied to a transmit end, a chip, a chipset, a functional module that is in a chip and that performs the method, or the like. The transmit end may be a terminal device, or may be a network device. The following describes the signal transmission method provided in this embodiment of this application by using an example in which a transmit end is a terminal device and a receive end is a network device. The method includes the following steps.

S601. A terminal device performs Fourier transform on M pieces of modulated data to obtain M pieces of frequency domain data. For a value of M, refer to the descriptions of M in step S301. Details are not described herein again.

For a process of obtaining the M pieces of modulated data by the terminal device, refer to the process of determining the M pieces of modulated data in step S301. Details are not described herein again.

For a process of performing Fourier transform on the M pieces of modulated data by the terminal device, refer to the process of performing Fourier transform on the M pieces of phase-rotated data by the terminal device in step S302. Details are not described herein again.

S602. The terminal device performs a cyclic shift on the M pieces of frequency domain data to obtain M pieces of shifted frequency domain data, where a shift length for performing the cyclic shift on the frequency domain data is determined based on M. The M pieces of frequency domain data mean that a length of the frequency domain data is M. Therefore, the shift length for performing the cyclic shift on the M pieces of frequency domain data is determined based on the length of the frequency domain data.

In an embodiment, the terminal device may cyclically shift the M pieces of frequency domain data rightwards to obtain the M pieces of shifted frequency domain data. For example, shifted frequency domain data with an index k in the M pieces of shifted frequency domain data may satisfy the following formula, where k traverses 0 to M−1, and k is an integer:

$$d_{shift}(k) = d_{fre}((k - Q_{shift}) \bmod M), \text{ where}$$

$d_{shift}(k)$ is the shifted frequency domain data with the index k in the M pieces of shifted frequency domain data, $d_{fre}((k - Q_{shift}) \bmod M)$ is frequency domain data with an index $(k - Q_{shift}) \bmod M$ in the M pieces of frequency domain data, $Q_{shift}$ is the shift length, $Q_{shift}$ is an integer, and a value of $Q_{shift}$ may be preconfigured by the terminal device, or a value of $Q_{shift}$ may be notified by a network device to the terminal device by using signaling, or a value of $Q_{shift}$ may be obtained by the terminal device according to a predefined rule. It can be learned that, when $Q_{shift}$ is a positive integer, shifted frequency domain data $d_{shift}$ is obtained by cyclically shifting frequency domain data $d_{fre}$ rightwards by $Q_{shift}$ pieces of data; or when $Q_{shift}$ is a negative integer, shifted frequency domain data $d_{shift}$ is obtained by cyclically shifting frequency domain data $d_{fre}$ leftwards by $Q_{shift}$ pieces of data.

For example, that the terminal device determines $Q_{shift}$ according to a predefined rule may be implemented by using the following formula:

$$Q_{shift} = \lfloor M \times A / h \rfloor, \text{ where}$$

A and h are integers, $\lfloor\ \rfloor$ indicates a round-down operation, and values of A and h may be preconfigured on the terminal device, or values of A and h may be obtained by the terminal device according to a predefined rule, or values of A and h may be notified by the network device to the terminal device by using signaling, for example, a value of A may be 1, −1, 3, or −3.

For example, a value of h is 4, and a value of $Q_{shift}$ may be $\lfloor M/4 \rfloor$, $\lfloor -M/4 \rfloor$, $\lfloor 3M/4 \rfloor$, or $\lfloor -3M/4 \rfloor$.

When M is less than 4 and a value of A is 1, a value of $Q_{shift}$ is 0. In this case, the shifted frequency domain data $d_{shift}$ is the same as the frequency domain data $d_{fre}$. Therefore, the terminal may not perform a cyclic shift on the M pieces of frequency domain data.

In the foregoing manner, the cyclic shift is performed on the frequency domain data $d_{fre}$ with the length of M to obtain the shifted frequency domain data $d_{shift}$ with the length of M. The shift length of the cyclic shift is determined by the length M. In this way, modulated data with different lengths has corresponding shift lengths, so that a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end. In addition, the signal transmission method provided in this embodiment of this application is applicable to BPSK modulated data with all lengths. For example, the length of the modulated data is an odd number, for example, M=3, M=5, M=7, or M=9.

S603. The terminal device determines time domain data based on the M pieces of shifted frequency domain data.

In an embodiment, the terminal device may sequentially perform frequency domain filtering and inverse Fourier transform on the M pieces of shifted frequency domain data to obtain the time domain data. Further, a cyclic prefix addition operation may be further performed after the inverse Fourier transform is performed. For processes of the frequency domain filtering, the inverse Fourier transform, and the cyclic prefix addition, refer to the processes of the frequency domain filtering, the inverse Fourier transform, and the cyclic prefix addition in the manner 1 of step S303. Details are not described herein again.

In an embodiment, the terminal device may sequentially perform inverse Fourier transform and time domain filtering on the M pieces of shifted frequency domain data to obtain the time domain data. Further, a cyclic prefix addition operation may be further performed after the time domain filtering is performed. For processes of the inverse Fourier transform, the time domain filtering, and the cyclic prefix addition operation, refer to the processes of the inverse Fourier transform, the time domain filtering, and the cyclic prefix addition operation in the manner 2 of step S303. Details are not described herein again.

In an embodiment, the terminal device may perform inverse Fourier transform on the M pieces of shifted frequency domain data to obtain the time domain data. Further, a cyclic prefix addition operation may be further performed after the time domain filtering is performed. For processes of the inverse Fourier transform and the cyclic prefix addition operation, refer to the processes of the inverse Fourier transform and the cyclic prefix addition operation in the manner 3 of step S303. Details are not described herein again.

S604. The terminal device sends the time domain data to the network device.

In an embodiment, before sending the time domain data to the network device, the terminal device may further amplify the time domain data by using a PA.

In this embodiment of this application, the cyclic shift is performed on the frequency domain data to implement an effect of performing phase rotation on the modulated data, and the shift length for performing the cyclic shift on the frequency domain data is determined based on the length of the frequency domain data, that is, the length of the modulated data. In this way, frequency domain data with different lengths has corresponding shift lengths. In this embodiment of this application, the cyclic shift is performed on the frequency domain data based on the shift length corresponding to the length of the frequency domain data, so that an effect of adjusting a phase of the modulated data based on a phase factor corresponding to the length of the modulated data can be implemented, and a PAPR of time domain data corresponding to the modulated data can be lower, thereby reducing a waveform distortion degree of the time domain data after the time domain data passes through a PA, increasing a power of an output signal obtained after the time domain data passes through the PA, and improving demodulation performance of a receive end.

In addition, during frequency domain filtering, an extraction operation is performed on the initial filter to obtain the frequency domain filter, so that the generated frequency domain filter is orthogonal. When frequency domain filtering is performed on the M pieces of frequency domain data, interference caused by the frequency domain filtering operation can be further reduced. Therefore, during ideal channel estimation with a known noise, the network device can correctly demodulate the modulated data.

In the foregoing embodiments provided in this application, the method provided in the embodiments of this application is described separately from perspectives of a transmit end, a receive end, and interaction between a transmit end and a receive end. To implement the functions in the method provided in the embodiments of this application, the transmit end may include a hardware structure and/or a software module, to implement the functions in a form of a hardware structure, a software module, or a combination of a hardware structure and a software module. Whether one of the foregoing functions is performed by using a hardware structure, a software module, or a combination of a hardware structure and a software module depends on particular applications and design constraints of the technical solutions.

Based on an invention concept same as that of the method embodiments, an embodiment of this application provides a signal transmission apparatus. The apparatus may be a transmit end, or may be a chip or a chipset in a transmit end, or a part, of a chip in a transmit end, that is configured to perform a related method and function, or may be another apparatus for implementing a function of the transmit end.

Figure 9A:
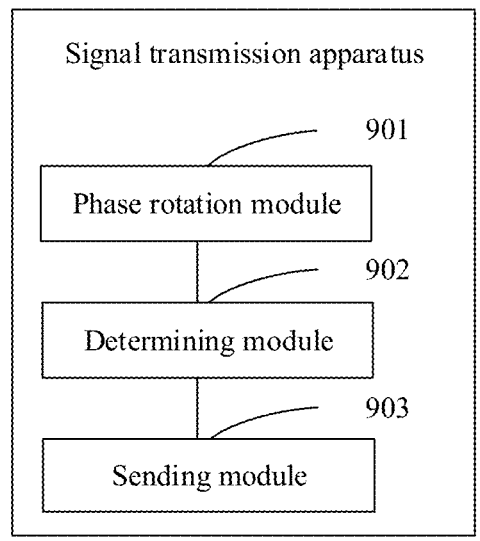
FIG. 9A is a schematic structural diagram of an apparatus according to this application.

In an embodiment, a structure of the signal transmission apparatus may be shown in FIG. 9A, and the apparatus includes a phase rotation module 901, a determining module 902, and a sending module 903. The phase rotation module 901 is configured to perform step S301 in the method shown in FIG. 3. The determining module 902 is configured to perform step S302 in the method shown in FIG. 3. The sending module 903 is configured to perform step S303 in the method shown in FIG. 3. For a specific process, refer to related descriptions in the embodiment shown in FIG. 3. Details are not described herein again.

Figure 9B:
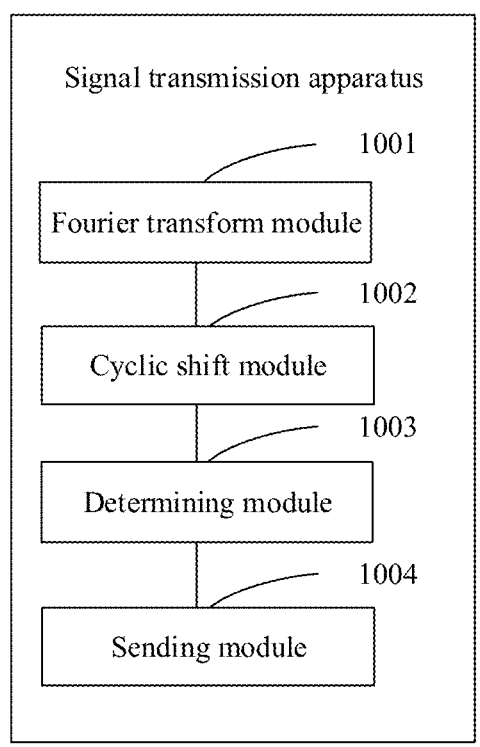
FIG. 9B is a schematic structural diagram of another apparatus according to this application.

In another embodiment, a structure of the signal transmission apparatus may be shown in FIG. 9B, and the apparatus includes a Fourier transform module 1001, a cyclic shift module 1002, a determining module 1003, and a sending module 1004. The Fourier transform module 1001 is configured to perform step S601 in the method shown in FIG. 8. The cyclic shift module 1002 is configured to perform step S602 in the method shown in FIG. 8. The determining module 1003 is configured to perform step S603 in the method shown in FIG. 8. The sending module 1004 is configured to perform step S604 in the method shown in FIG. 8. For a specific process, refer to related descriptions in the embodiment shown in FIG. 8. Details are not described herein again.

The module division in the embodiments of this application is an example, and is merely logical function division, and there may be other division manners in actual implementation. In addition, functional modules in the embodiments of this application may be integrated in one processor, or each of the modules may exist alone physically, or at least two modules may be integrated in one module. The integrated module may be implemented in a form of hardware, or may be implemented in a form of a software functional module.

Figure 10:
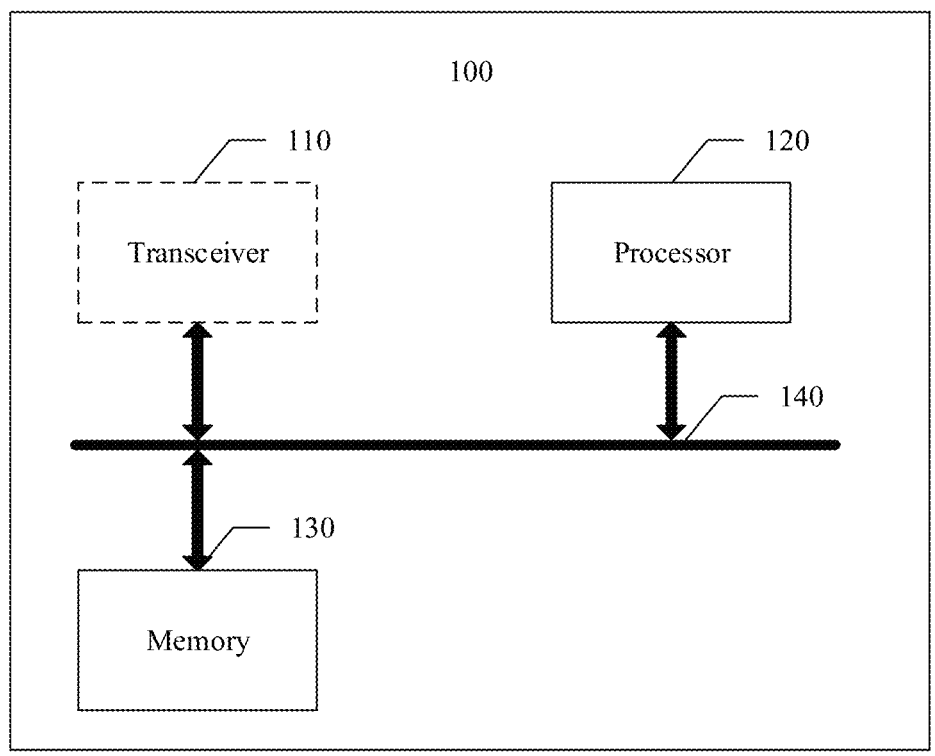
FIG. 10 is a schematic structural diagram of an apparatus according to this application.

FIG. 10 shows an apparatus 100 according to an embodiment of this application. The apparatus 100 is configured to implement functions of the transmit end in the foregoing methods. The apparatus may be a transmit end, or may be an apparatus in a transmit end. The apparatus may be a chip system. In this embodiment of this application, the chip system may include a chip, or may include a chip and another discrete device. The apparatus 100 includes at least one processor 120, configured to implement functions of the transmit end in the methods provided in the embodiments of this application. For example, the processor 120 may separately perform phase rotation on M pieces of modulated data, and determine time domain data based on M pieces of phase-rotated data. For details, refer to detailed descriptions in the method examples. Details are not described herein again. For another example, the processor 120 may perform Fourier transform on M pieces of modulated data, perform a cyclic shift on M pieces of frequency domain data, and determine time domain data based on M pieces of shifted frequency domain data. For details, refer to detailed descriptions in the method examples. Details are not described herein again.

The apparatus 100 may further include at least one memory 130, configured to store program instructions and/or data. The memory 130 is coupled to the processor 120. In this embodiment of this application, the coupling is indirect coupling or a communication connection between apparatuses, units, or modules, may be in an electrical, mechanical, or another form, and is used for information exchange between the apparatuses, the units, or the modules. The processor 120 and the memory 130 may perform an operation cooperatively. The processor 120 may execute the program instructions stored in the memory 130. At least one of the at least one memory may be included in the processor.

The apparatus 100 may further include a communications interface 110, configured to communicate with another device by using a transmission medium, so that an apparatus used in the apparatus 100 may communicate with another device. For example, the device may be a network device. The processor 120 sends and receives data by using the communications interface 110, for example, sends time domain data to a receive end. In this embodiment of this application, the communications interface may be a transceiver, a bus, a bus interface, a circuit, or another apparatus that can implement a communication function. This is not limited in this application. FIG. 10 shows an example in which the communications interface 110 is a transceiver 110.

In this embodiment of this application, a specific connection medium between the transceiver 110, the processor 120, and the memory 130 is not limited. In this embodiment of this application, in FIG. 10, the memory 130, the processor 120, and the transceiver 110 are connected by using a bus 140. The bus is represented by a bold line in FIG. 10. A connection manner between other components is described merely as an example and does not constitute a limitation. The bus may be classified into an address bus, a data bus, a control bus, and the like. For ease of representation, only one thick line is used to represent the bus in FIG. 10, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module.

In this embodiment of this application, the memory may be a non-volatile memory, for example, a hard disk drive (HDD) or a solid-state drive (SSD); or may be a volatile memory, for example, a random access memory (RAM). The memory is any other medium that can be used to carry or store expected program code in a form of an instruction or a data structure and that can be accessed by a computer. However, this is not limited thereto. The memory in this embodiment of this application may be alternatively a circuit or any other apparatus that can implement a storage function, and is configured to store program instructions and/or data.

All or some of the foregoing methods in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, a network device, user equipment, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
separately performing phase rotation on M pieces of modulated data to obtain M pieces of phase-rotated data, wherein a phase factor used for performing phase rotation on the M pieces of modulated data is determined based on M, wherein M is a positive integer;
determining time domain data based on the M pieces of phase-rotated data; and
sending the time domain data to a receive end,
wherein the separately performing phase rotation on M pieces of modulated data comprises:
performing phase rotation on modulated data with an index m in the M pieces of modulated data based on a phase factor corresponding to the modulated data with the index m, wherein m traverses 0 to M−1, and m is an integer; and
the phase factor corresponding to the modulated data with the index m is:

$$e^{j \times \varphi_m} = e^{j 2\pi \times m \times \lfloor M \times A/h \rfloor / M}, \text{wherein}$$

$e^{j \times \varphi_m}$ is the phase factor corresponding to the modulated data with the index m, and A and h are integers.

2. The method according to claim 1, wherein the determining time domain data based on the M pieces of phase-rotated data comprises:
sequentially performing a Fourier transform, frequency domain filtering, and an inverse Fourier transform on the M pieces of phase-rotated data to obtain the time domain data, wherein
a frequency domain filter for the frequency domain filtering is determined based on an initial filter comprising K×M filter coefficients, and the frequency domain filter comprises M filter coefficients.

3. The method according to claim 2, wherein the determining a frequency domain filter based on an initial filter comprising K×M filter coefficients comprises:
extracting the M filter coefficients from the K×M filter coefficients in the initial filter at a step of K to obtain the frequency domain filter.

4. The method according to claim 2, wherein a location, in the initial filter, of a filter coefficient with an index m in the frequency domain filter satisfies the following formula:

$$S_{filter}(m) = S_{base}((A \times K \times M/h) \bmod K + m \times K), \text{wherein}$$

$S_{filter}(m)$ indicates the filter coefficient with the index m in the frequency domain filter coefficients, $S_{base}((A \times K \times M/h) \bmod K + m \times K)$ indicates a filter coefficient with an index $(A \times K \times M/h) \bmod K + m \times K$ in the initial filter, and A and h are integers.

5. The method according to claim 2, wherein K is determined based on M.

6. The method according to claim 1, wherein the determining time domain data based on the M pieces of phase-rotated data comprises:
sequentially performing a Fourier transform, an inverse Fourier transform, and time domain filtering on the M pieces of phase-rotated data to obtain the time domain data, wherein
a time domain filter coefficient for the time domain filtering is determined based on signaling from a network device.

7. The method according to claim 1, wherein the M pieces of modulated data are binary phase shift keying (BPSK) modulated data.

8. An apparatus, comprising a processor and a memory, wherein the memory stores instructions; and
when the processor executes the instructions, the apparatus is enabled to:
separately perform phase rotation on M pieces of modulated data to obtain M pieces of phase-rotated data, wherein a phase factor used for performing phase rotation on the M pieces of modulated data is determined based on M, wherein M is a positive integer;
determine time domain data based on the M pieces of phase-rotated data; and
send the time domain data to a receive end,
wherein when the processor executes the instructions, the apparatus is enabled to:
perform phase rotation on modulated data with an index m in the M pieces of modulated data based on a phase factor corresponding to the modulated data with the index m, wherein m traverses 0 to M−1, and m is an integer; and
the phase factor corresponding to the modulated data with the index m is:

$$e^{j \times \varphi_m} = e^{j 2\pi \times m \times \lfloor M \times A/h \rfloor / M}, \text{wherein}$$

$e^{j \times \varphi_m}$ is the phase factor corresponding to the modulated data with the index m, and A and h are integers.

9. The apparatus according to claim 8, wherein when the processor executes the instructions, the apparatus is enabled to:
sequentially perform a Fourier transform, frequency domain filtering, and an inverse Fourier transform on the M pieces of phase-rotated data to obtain the time domain data, wherein
a frequency domain filter for the frequency domain filtering is determined based on an initial filter comprising K×M filter coefficients, and the frequency domain filter comprises M filter coefficients.

10. The apparatus according to claim 9, wherein when the processor executes the instructions, the apparatus is enabled to:
extract the M filter coefficients from the K×M filter coefficients in the initial filter at a step of K to obtain the frequency domain filter.

11. The apparatus according to claim 9, wherein a location, in the initial filter, of a filter coefficient with an index m in the frequency domain filter satisfies the following formula:

$$S_{filter}(m) = S_{base}((A \times K \times M/h) \bmod K + m \times K), \text{wherein}$$

$S_{filter}(m)$ indicates the filter coefficient with the index m in the frequency domain filter coefficients, $S_{base}((A \times K \times M/h) \bmod K + m \times K)$ indicates a filter coefficient with an index $(A \times K \times M/h) \bmod K + m \times K$ in the initial filter, and A and h are integers.

12. The apparatus according to claim 9, wherein K is determined based on M.

13. The apparatus according to claim 8, wherein when the processor executes the instructions, the apparatus is enabled to:

sequentially perform a Fourier transform, an inverse Fourier transform, and time domain filtering on the M pieces of phase-rotated data to obtain the time domain data, wherein a time domain filter coefficient for the time domain filtering is determined based on signaling from a network device.

14. The apparatus according to claim 8, wherein the M pieces of modulated data are binary phase shift keying (BPSK) modulated data.

15. A non-transitory memory comprising processor-executable instructions stored thereon, wherein the processor-executable instructions are executable by a processor to carry out the following:

separately performing phase rotation on M pieces of modulated data to obtain M pieces of phase-rotated data, wherein a phase factor used for performing phase rotation on the M pieces of modulated data is determined based on M, wherein M is a positive integer;

determining time domain data based on the M pieces of phase-rotated data; and sending the time domain data to a receive end, wherein the separately performing phase rotation on M pieces of modulated data comprises:

performing phase rotation on modulated data with an index m in the M pieces of modulated data based on a phase factor corresponding to the modulated data with the index m, wherein m traverses 0 to M−1, and m is an integer; and the phase factor corresponding to the modulated data with the index m is:

$$e^{j \times \varphi_m} = e^{j2\pi \times m \times \lfloor M \times A/h \rfloor / M}, \text{wherein}$$

$e^{j \times \varphi_m}$ is the phase factor corresponding to the modulated data with the index m, and A and h are integers.

16. The non-transitory memory according to claim 15, wherein the determining time domain data based on the M pieces of phase-rotated data comprises:

sequentially performing a Fourier transform, frequency domain filtering, and an inverse Fourier transform on the M pieces of phase-rotated data to obtain the time domain data, wherein a frequency domain filter for the frequency domain filtering is determined based on an initial filter comprising K×M filter coefficients, and the frequency domain filter comprises M filter coefficients.

17. The non-transitory memory according to claim 16, wherein the determining a frequency domain filter based on an initial filter comprising K×M filter coefficients comprises:

extracting the M filter coefficients from the K×M filter coefficients in the initial filter at a step of K to obtain the frequency domain filter.

18. The non-transitory memory according to claim 16, wherein a location, in the initial filter, of a filter coefficient with an index m in the frequency domain filter satisfies the following formula:

$$S_{filter}(m) = S_{base}((A \times K \times M/h) \bmod K + m \times K), \text{wherein}$$

$S_{filter}(m)$ indicates the filter coefficient with the index m in the frequency domain filter coefficients, $S_{base}((A \times K \times M/h) \bmod K + m \times K)$ indicates a filter coefficient with an index $(A \times K \times M/h) \bmod K + m \times K$ in the initial filter, and A and h are integers.

19. The non-transitory memory according to claim 16, wherein K is determined based on M.

20. The non-transitory memory according to claim 15, wherein the determining time domain data based on the M pieces of phase-rotated data comprises:

sequentially performing a Fourier transform, an inverse Fourier transform, and time domain filtering on the M pieces of phase-rotated data to obtain the time domain data, wherein a time domain filter coefficient for the time domain filtering is determined based on signaling from a network device.

* * * * *